US006739456B2

(12) United States Patent
Svoronos et al.

(10) Patent No.: US 6,739,456 B2
(45) Date of Patent: May 25, 2004

(54) APPARATUS AND METHODS FOR SEPARATING PARTICLES

(75) Inventors: Spyros A. Svoronos, Gainesville, FL (US); H. Steven Crouch, Chapel Hill, NC (US); Hassan El-Sayed El-Shall, Gainesville, FL (US); Kevin W. Powers, Gainesville, FL (US); Gary Wayne Scheiffele, Gainesville, FL (US); Rachel Anna Worthen, Katy, TX (US); Steve Robin Wright, Hillsborough, NC (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 106 days.

(21) Appl. No.: 10/161,019

(22) Filed: Jun. 3, 2002

(65) Prior Publication Data

US 2003/0221996 A1 Dec. 4, 2003

(51) Int. Cl.$^7$ .............................. B04B 5/12; B03B 5/32
(52) U.S. Cl. .................... 209/725; 209/139.1; 209/710; 209/713; 209/717; 209/734
(58) Field of Search .............................. 209/138, 139.1, 209/142, 710, 711, 713, 714, 715, 717, 719, 720, 721, 722, 725, 727, 734

(56) References Cited

U.S. PATENT DOCUMENTS

| 3,174,264 A | * | 3/1965 | McKnab | 55/317 |
| 3,643,800 A | | 2/1972 | Mansson | |
| 3,656,618 A | | 4/1972 | Janich | |

(List continued on next page.)

FOREIGN PATENT DOCUMENTS

| DE | 3800843 A1 | * | 6/1989 | | B07B/7/083 |

OTHER PUBLICATIONS

"Power Test Code 28: Determining the Properties of Fine Particulate Matter", American Society of Mechancial Engineers, International, New York, 1985.

Bickert et al., "Grinding circuit for fine particles in liquid suspensions with a new counter–flow centrifugal classifier," Elsevier Science B.V., International Journal of Mineral Processing, vol. 44–45 (Netherlands), p. 733–741, (1996).

Furukawa et al., "Comminution of Particles in Centrifugal Air Classifier," Proceedings of Second World Congress Particle Technology (Japan), p. 104–111, (Sep. 19–22, 1990).

Galk et al., "Industrial classification in a new impeller wheel classifier," Powder Technology, Elsevier Science S.A. (Netherlands), p. 186–189, (1999).

(List continued on next page.)

Primary Examiner—Donald P. Walsh
Assistant Examiner—Joseph Rodriguez
(74) Attorney, Agent, or Firm—Akerman Senterfitt

(57) ABSTRACT

An apparatus for classifying a mixture of fine and coarse particles in a fluid stream by size or density comprises a housing, a boundary layer momentum transfer device, and an inlet flow control mechanism. The housing comprises an inlet, an interior chamber, and a fine particle outlet. The boundary layer momentum transfer device comprises a plurality of disks stacked in spaced, parallel relation in the interior chamber. The disks are rotatable about a disk axis. The disks have respective central openings cooperatively defining a plenum having a closed axial end and an opposing open axial end. The plenum communicates with spaces defined between each adjacent disk to cooperatively define a fine particle flow path from the interior chamber, through the spaces, through the plenum and the open axial end thereof, and to the fine particle outlet. The inlet flow control mechanism communicates with the interior chamber and provides an adjustable inlet flow path into the interior chamber. The housing can include a cylindrical, conical, and/or scroll-shaped profile.

41 Claims, 16 Drawing Sheets

U.S. PATENT DOCUMENTS

| | | | |
|---|---|---|---|
| 3,667,600 A | 6/1972 | Oi et al. | |
| 3,669,265 A | 6/1972 | Conley | |
| 3,670,886 A | 6/1972 | Hosokawa et al. | |
| 3,682,302 A | 8/1972 | Bernutat | |
| 3,708,067 A | 1/1973 | Javet | |
| 3,731,800 A | 5/1973 | Timson | |
| 3,734,287 A | 5/1973 | Jager | |
| 3,891,543 A | 6/1975 | Wessel | |
| 3,901,794 A | 8/1975 | Henne et al. | |
| 3,933,626 A | 1/1976 | Stukel et al. | |
| 3,960,714 A | 6/1976 | Strauss | |
| 4,059,507 A | 11/1977 | Nobuo | |
| 4,066,535 A | 1/1978 | Strauss | |
| 4,071,441 A | 1/1978 | Schauer | |
| 4,100,061 A | 7/1978 | Eickholt et al. | |
| 4,211,641 A | 7/1980 | Jager | |
| 4,236,997 A | 12/1980 | Wessel et al. | |
| 4,257,880 A | 3/1981 | Jones | |
| 4,260,478 A | 4/1981 | Hosokawa et al. | |
| 4,296,864 A | 10/1981 | Misaka et al. | |
| 4,388,183 A | 6/1983 | Thomas | |
| 4,390,419 A | 6/1983 | Barthelmess | |
| 4,409,097 A | 10/1983 | Barthelmess | |
| 4,515,686 A | 5/1985 | Janich | |
| 4,551,241 A | 11/1985 | Saverse et al. | |
| 4,560,471 A | 12/1985 | Yamada et al. | |
| 4,602,924 A | 7/1986 | Eschenburg | |
| 4,626,343 A | 12/1986 | Folsberg | |
| 4,661,244 A | 4/1987 | Hanke et al. | |
| 4,689,140 A | 8/1987 | Folsberg | |
| 4,793,917 A | 12/1988 | Eremin et al. | |
| 4,799,595 A | 1/1989 | Binder | |
| 4,869,786 A | 9/1989 | Hanke | |
| 5,024,754 A | 6/1991 | Patzelt et al. | |
| 5,229,014 A * | 7/1993 | Collins | 210/787 |
| 5,354,002 A | 10/1994 | Folsberg | |
| 5,366,095 A | 11/1994 | Martin | |
| 5,746,789 A | 5/1998 | Wright et al. | |
| 6,202,854 B1 * | 3/2001 | Krieser et al. | 209/135 |
| 2003/0085158 A1 * | 5/2003 | Oirschot | 209/139.1 |

OTHER PUBLICATIONS

Johansen, et al., "Some considerations regarding optimum flow fields for centrifugal air classification," International Journal of Mineral Processing, vol. 44–45, Elsevier (Netherlands), p. 703–721, (1996).

Johansen et al., "A two–phase model for particle local equilibrium applied to air classification of powders," Powder Technology, vol. 63, Elsevier Sequoia (The Netherlands), p. 121–132, (1990).

Kurt Leschonski, "Classification of Particles in the Submicron Range in an Impeller Wheel Air Classifier," KONA Powder and Particle, No. 14, p. 52–59, (1996).

Luckie et al., "Fundamentals of Size Separation," KONA, No. 18, p. 88–101, (2000).

Roland Nied, "CFS–HD: A new classifier for fine classification with high efficiency," International Journal of Mineral Processing, vol. 44–45, Elsevier Science B.V. (Netherlands), p. 723–731, (1996).

Wang et al., "A model for performance of the centrifugal countercurrent air classifier," Powder Technology, vol. 98, Elsevier (Netherlands), p. 171–176, (1998).

Wang et al., "Study on horizontal turbine classification," Powder Technology, vol. 102, Elsevier (Netherland), p. 166–170, (1999).

Bauer et al., "Air Classification in the Submicron Range with a Deflector Wheel Classifier," World Congress on Particle Technology (UK), (Jul. 2001).

Bickert et al., "A New Centrifugal Classifier for the Separation of Concentrated Suspensions under 10 u.m.," Advances in Filtration and Separation Technology, vol. 9, American Filteration and Separation Society (USA), p. 531–534, (1995).

Iinoya et al., "Air Cyclone Classifier for Submicron Size," Proceedings of Second World Congress Particle Technology (Japan), p. 120–127, (Sep. 19–22, 1990).

Powitz et al., "A Centrifugal Cross Flow Classifier for Cut Sizes in the Submicron Range," World Congress on Particle Technology (UK), (Jul. 1998).

Jurt Leschonski, "Short Course on Selected Topics of Particle Technology," p. i–ii, 39–116, (1998).

* cited by examiner

APPARATUS AND METHODS FOR SEPARATING PARTICLES

GOVERNMENT INTEREST

This invention was made with Government support under Grant No. EEC-94-2989 awarded by the National Science Foundation. The Government has certain rights in the invention.

TECHNICAL FIELD

The present invention relates generally to particle classification. More particularly, the present invention relates to the classification of particles from a fluid stream via centrifugal separation imparted by boundary layers developed between rotating parallel disks, whereby the primary airflow runs counter to the ejected trajectory of the particles larger than the cut-size of the device. Fine particles smaller in diameter than the cut-size of the classifier follow the primary airflow streamlines to a collection vessel.

BACKGROUND ART

Air classifiers can be used to classify, or selectively filter, airborne particles according to their size, density, or shape based on a balance between inertial and fluid forces acting on the particles in a flow field. Air classifiers are used primarily to produce particles in a limited size range. Production of powders in a limited size range is important in many different types of industries (e.g., electronics, food, chemical, petroleum, and pharmaceuticals), where product quality depends on the size distribution of the powder used to make the product. Size distribution affects powder properties such as homogeneity, flowability, taste, texture, and surface area. A narrow size distribution can give the final product more uniformity to improve product quality. Industries commonly use air classifiers to classify dry powders because they can handle higher mass throughputs than other methods such as screening. In the production of fine powders, air classification often follows a comminution, or grinding, process. Powder generated from the grinding process is sent to an air classifier to remove the coarser particles.

Most air classifiers separate the feed material into two size groups: a coarse fraction and a fine fraction. Separation is typically measured by efficiency, which can be generally defined as the fraction of particles of a given size (d) in the feed reporting to the coarse fraction, $$Efficiency(d) = f_c \frac{q_c(d)}{q_F(d)} \tag{1-1}$$

where $f_c$ is the overall efficiency, or the overall mass fraction of particles in the feed reporting to the coarse fraction, and $q_C(d)$ and $q_F(d)$ are the differential size distributions of the coarse fraction and feed, respectively. Cut size is most often defined as the particle size with 50% efficiency ($d_{50}$), efficiency ($d=d_{50}$)=0.50.

The ideal efficiency curve is a unit step function at the cut size. That is, all particles below the cut size leave with the air in the fine fraction, while all particles above the cut size are collected from the air as the coarse fraction. Theoretically, particles at the cut size should be suspended in the classification zone since the forces acting on the particles are balanced. In reality, 50% of particles at the cut size leave with the coarse fraction, and 50% leave with the fine fraction. Air classifiers do not give an ideal separation of particles at the cut size because of random fluctuations in the flow field, particle-particle interactions, and variations in the forces acting on the particles in relation to the position of the particles in the classifier. The quality of the separation, or cut sharpness, is commonly represented by the values $K_{25/75}$ and $K_{10/90}$, which are respectively defined as:

$$K_{25/75}=d_{25}/d_{75} \tag{1-2}$$

$$K_{10/90}=d_{10}/d_{90} \tag{1-3}$$

where $d_{10}$, $d_{25}$, and $d_{90}$ are the particle diameters with 10, 25, 75 and 90% efficiency, respectively. Under normal circumstances, $K_{25/75}$ and $K_{10/90}$ can have values between 0 and 1, where 1 represents an ideal separation.

The extent to which particles are dispersed in air contributes to cut sharpness. To accurately classify a powder, each particle must travel through the flow field independent of other particles. Therefore, to minimize the amount of particle agglomerates entering the classifier, the feed should be dispersed before classification. The energy necessary to disperse a powder can be supplied mechanically (e.g., a mixing blade) or by shear force (e.g., feeding the particles into a high-velocity air stream). Since agglomeration is often caused by moisture in the air, the relative humidity of the air should be sufficiently low. However, if humidity is too low, the particles can become electrostatically charged, which also hinders dispersion. The optimum relative humidity for classification is approximately 50 to 70%. Particle size also affects dispersion, since attractive forces between particles increase as particle size decreases. Because of the difficulty in dispersing very fine particles, especially below 1 μm, these particles are commonly collected with the coarse fraction as agglomerates. As solids loading, or particle concentration, increases, adequate dispersion becomes more difficult. Consequently, cut sharpness must be compromised for a higher particle loading. This is a dilemma for industries, which need to classify particles at high throughputs to minimize energy consumption.

The lower limit on cut size for air classifiers is typically 1 or 2 μm. For particles less than 1 μm, extremely high tangential velocities are required for the inertial force to overcome the fluid forces on the particles. Random particle motion caused by diffusion and Brownian motion also becomes significant below 1 μm. See Leschonski, K., "Classification of particles in the submicron range in an impeller wheel air classifier," KONA, No. 14, pp. 52–60 (1996). This is more of a problem if the flow is turbulent. Submicron cut sizes have been achieved by air classification, but only for limited throughputs. In addition, achieving sharp cuts at these small cut sizes is a challenge because of the difficulty in dispersing submicron particles.

Separation of particles from the air stream can be either counterflow or crossflow. In counterflow classifiers, particles are removed from the fluid in the direction opposite to the main flow. In crossflow classifiers, particles are removed perpendicular to the main flow. Particle removal is usually accomplished by gravity or inertial forces, such as centrifugal force, which is due to the angular momentum of the flow. Because centripetal acceleration can be much stronger than gravitational acceleration at high tangential velocities, centrifugal classifiers are able to remove smaller particles from the flow than gravity-based classifiers. In general, counterflow classifiers can provide smaller cut sizes than crossflow classifiers, with the counterflow centrifugal classifier providing the smallest cut sizes. The approximate cut size range for counterflow centrifugal air classifiers is 1 to 100 μm for mineral particle densities (~2000 to 3000 kg/m$^3$). The only other type of classifier that has achieved cut sizes as small as the counterflow centrifugal classifier is the crossflow elbow classifier. See Maly, K., "Untersuchung der partikel-strömungsmittel-wechselwirkung im strahlumlenk-windsichter," Dissertation, Techn. Hochschule Karlsruhe, Germany (1979); Rumpf, H. and Leschonski, K., "Prinzipien und neuere verfahren der windsichtung, Chemie-Ing.-Technik," Vol. 39, pp. 1231–1241 (1967). However, the crossflow elbow classifier cannot handle as high throughputs.

The basic principle of centrifugal counterflow classification can be understood from a force balance on the particle in the radial direction. For a particle in a rotating flow field, neglecting gravity and assuming particle density ($\rho_p$) is much greater than fluid density ($\rho$), the equation of motion in the r-direction is given by:

$$m_p \frac{dv_{r,p}}{dt} = F_D + m_p \frac{v_{\theta,p}^2}{r} = F_D + F_C; \quad F_C = m_p \frac{v_{\theta,p}^2}{r} \tag{1-4}$$

where $m_p$ is the particle mass, $v_{r,p}$ and $v_{\theta,p}$ are the particle radial and tangential velocities, $F_D$ is the drag force, and $F_C$ is the centifugal force. For a spherical particle, $$m_p = \pi/6 \rho_p D_p^3 \tag{1-5}$$

where $D_p$ is the particle diameter. Considering only particles in the Stokes, or "creeping," flow regime, $F_D$ is given by Stokes law:

$$F_D = 3\pi\mu D_p(v_r - v_{r,p}) \tag{1-6}$$

where $\mu$ and $v_r$ are the fluid dynamic viscosity and radial velocity. Equation 1-6 generally holds for $Re_p < 2$ and $D_p > 1$ $\mu$m. The relative particle Reynolds number ($Re_p$) is given by:

$$Re_p = \frac{\rho D_p |v_r - v_{r,p}|}{\mu} \tag{1-7}$$

Substituting Equations 1-5 and 1-6 into Equation 1-4 gives:

$$m_p \frac{dv_{r,p}}{dt} = 3\pi\mu D_p(v_r - v_{r,p}) + \frac{\pi}{6}\rho_p D_p^3 \frac{v_{\theta,p}^2}{r} \tag{1-8}$$

For counterflow centrifugal classification, $F_C$ must act opposite to $F_D$. Since $F_C$ acts radially outward in the positive r-direction, the main fluid flow is radially inward, in the negative redirection, so that $v_r < 0$. Since $F_C$ is proportional to $D_p^3$, while $F_D$ is only proportional to $D_p$, $F_C$ becomes the dominant force as $D_p$ increases, making it more likely that the particle will be removed from the air. The theoretical cut size ($D_{pc}$) is determined by setting $v_{r,p}$ and the particle acceleration $$\left(\frac{dv_{r,p}}{dt}\right)$$

to 0 in Equation 1-8:

$$D_{pc} = \sqrt{\frac{18\mu v_r r}{\rho_p v_{\theta,p}^2}} \tag{1-9}$$

A particle of diameter $D_{pc}$ will revolve around the axis of rotation at a constant radius.

In a centrifugal classifier, the flow can be either free or forced vortex. The difference between a free and forced vortex is in the dependence of the fluid tangential velocity ($v_\theta$) on radius (r). In a free vortex, $$v_\theta(r) \propto \frac{1}{r^m} \tag{1-10}$$

where m=1 in an ideal free vortex. To account for friction losses, m is usually set a value between 0.5 and 0.9. In a forced vortex, m=−1. For a non-accelerating particle of diameter $D_{pc}$, from the particle equation of motion in the tangential direction, $$m_p \left( 2v_{r,p} \frac{v_{\theta,p}}{r} + r \frac{d}{dt}\left(\frac{v_{\theta,p}}{r}\right) \right) = 3\pi\mu D_p(v_\theta - v_{\theta,p}) \tag{1-11}$$

the particle tangential velocity is equal to the fluid tangential velocity, $$v_{\theta,p} = v_\theta \tag{1-12}$$

From Equations 1-10 and 1-12, in a free vortex, $F_C$ (Equation 1-4) is inversely proportional to $r^{(1+2m)}$, while in a forced vortex, $F_C$ is directly proportional to r. Therefore, in a free vortex, $F_C$ increases as r decreases; but in a forced vortex, $F_C$ decreases as r decreases.

In a counterflow centrifugal classifier, $v_r$ is generally given by the fluid volumetric flow rate (Q) divided by the cross-sectional area for flow, assuming $v_r$ is uniform in the axial and tangential directions, $$v_r(r) = \frac{Q}{2\pi r L} \tag{1-13}$$

where L is the height in the axial direction of the flow channel. If Equation 1-13 holds, $F_D$ (Equation 1-6) is inversely proportional to r. Substituting Equation 1-12 into Equation 1-9 and using Equations 1-10 and 1-13, one finds that in a free vortex, $$D_{pc} \propto r^m, 0.5 > m > 1 \tag{1-14}$$

but in a forced vortex, $$D_{pc} \propto 1/r$$

It has been shown that to obtain a sharp cut of particles in a counterflow centrifugal classifier, $D_{pc}$ in the direction of flow (radially inward) must increase. See Rumpf, H. and Leschonski, K., "Prinzipien und neuere verfahren der windsichtung," Chemie-Ing.-Technik, Vol. 39, pp. 1231–1241 (1967). Therefore, the flow must be a forced vortex.

To understand the advantages of having a forced vortex over a free vortex, consider a particle of diameter $D_{pc}$, which has an equilibrium radius ($r_{eq}$) where $|F_C| = |F_D|$ and $v_{r,p} = 0$. At $r_{eq}$, the particle follows a trajectory of constant radius. If the particle encounters a small perturbation from $r_{eq}$ in the r-direction, the forces on the particle are no longer equal. In a free vortex, if the particle moves to a smaller r, $F_c$ increases faster than $F_D$ returning the particle to $r_{eq}$. Thus, in a free vortex, stable trajectories are formed, suspending particles in the flow, which is clearly not good for classification. On the other hand, in a forced vortex, $r_{eq}$ is an unstable equilibrium point, because $F_D$ and $F_C$ pull the particle away from $r_{eq}$, assisting in the division of particles at $D_{pc}$.

Also contributing to the cut sharpness in a forced vortex is the short residence time of the particles. Because of stable equilibria that form in a free vortex, particles have a longer residence time. This causes particles to accumulate in the classification region, increasing the likelihood that agglomerates will form. In a forced vortex, since particles do not accumulate, agglomeration is less likely.

The principle of counterflow centrifugal classification in a free vortex sink flow has been studied. See Rumpf, H., "Über die Sichtwirkung von ebenen spiraligen Luftströmungen," Dissertation, Techn. Hochschule Karlsruhe, Germany (1939). A spiral classifier has been developed based on this principle and sold commercially as the Walther™ classifier. See Rumpf, H. and Wolf, K., Z. VDI, Beihefte Verfahrenstechnik, Vol. 29/38 (1941). The Walther™ classifier has a scroll-shaped housing. Air and particles enter the classifier tangentially and are sent to the classification zone at a controlled angle through eight jets. Air and fine particles exit axially through the center of the classifier. Coarse particles are removed from the air by centrifugal force and are collected in an annular region at the bottom of the classifier. Cut size is controlled by air flow rate.

In another concept for spiral classification tested experimentally to improve cut sharpness, air and particles are supplied together to a cylindrical classifier tangentially through a channel of reducing cross-sectional area to accelerate the air and disperse the particles. See Leschonski, K. and Rumpf, H., Powder Technology, Vol. 2, pp. 175–188 (1968); Weilbacher. M. and Rumpf. H., Aufbereitungstechnik, Vol. 9, No. 7, pp. 323–330 (1968). The height of the channel is the same as that of the classifier. While air and fines exit the classifier through the center, the coarse fraction collects and circulates around the periphery of the classifier. In this way, the coarse fraction is incorporated into the feed stream and re-classified. This process can be continued repeatedly until the coarse fraction is withdrawn through a side vent, which can be opened and closed during operation. By recycling the coarse fraction into the classification region, this classifier can obtain a better separation of coarse and fines at smaller cut sizes than other spiral classifiers. Besides air flow rate, cut size also depends on the volume of material rotating at the periphery of the classifier. As the volume of material increases, the pressure drop decreases, which tends to increase the cut size.

A spiral classifier has been developed that forces the main air stream to pass through a perforated cylindrical wall before combining with the feed. See Metzger, K. L., Richter, W., Schwedes, J., Aufbereitungstechnik, Vol. 20, No. 10, pp. 589–590 (1979). This provides more uniform radial velocity into the classification zone, which is important in achieving a sharp cut. The feed is supplied tangentially to the classifier with a secondary air stream, which adds a tangential component to the air velocity. The diameter of the tube in the center of the classifier through which air and fines exit can be adjusted to control cut size. The coarse fraction exits the classifier tangentially.

In a twin-cone vane classifier described by Luckie, P. T. and Klima, M. S., "Fundamentals of size separation," KONA, No. 18, pp. 88–101 (2000) air and particles enter through the bottom of the outer cone of the classifier and travel upward to adjustable guide vanes. The vanes are located above the inner cone in the short cylindrical section of the classifier. Air and particles are accelerated tangentially before passing through the vanes and into the inner cone. Coarse particles are thrown outward to the wall of the inner cone and fall out of the flow. The fine fraction is carried with the air through an exit tube at the top of the classifier. The guide vanes are typically turned at an angle from the radial direction to increase the centrifugal force on the particles. In general, as the vane angle is increased, efficiency increases, and cut size decreases. Cut sizes down to 20 $\mu$m have been achieved with the twin-cone, vane classifier. See National Academy of Sciences, Committee on Comminution and Energy Consumption, Report No. 364 (1981).

Gas cyclones are also counterflow centrifugal separators with free vortex sink flow, and have been widely used to remove dust from air. Because of their simple design and inexpensive operation with no moving parts, they are commonly used in industry. Referring to FIG. 1, a conventional gas cyclone, generally designated 10, is illustrated. The standard cyclone design entails a cylindrical section 12 on the top and a conical section 14 on the bottom. Typically, conical section 14 is longer than cylindrical section 12. Air and particles enter gas cyclone 10 at the top tangentially through an inlet 16 with a square or rectangular cross-sectional area, as indicated by arrow A, and swirl within gas cyclone 10 as indicated by arrow B. The coarse fraction is collected at the outer wall of gas cyclone 10 where it falls to the bottom, as indicated by arrow C. Air and fines spiral inward, enter a vortex finder 18 disposed at the top of gas cyclone 10 as indicated by arrow D, and exit gas cyclone 10 as indicated by arrow E. Although mainly used for dust collection and air purification, cyclone separators such as gas cyclone 10 can be used to classify particles. However, because of their turbulent, free vortex flow, gas cyclones do not give as sharp a cut as counterflow centrifugal classifiers with forced vortex flow.

Some free vortex classifiers have rotating walls at the top and bottom of the classification zone. Stationary walls can have adverse effects on classification performance because of decreased flow velocities in this region. A spiral classifier with rotating walls has been developed and sold commercially as Alpine Mikroplex™ classifiers. See Rumpf, H. and Kaiser, F., Chemie-Ing.-Technik, Vol. 24, No. 129, pp. 935 (1952). In the basic Mikroplex™ spiral classifier with rotating walls, air is pulled into a cylindrical, scroll-shaped housing and passes through adjustable guide vanes surrounding the classification zone before combining with the particle feed. Air and particles then enter the classification zone, which has a rotating wall above and below it. The wall rotates at the same speed as the fan that drives the air flow. Air and fine particles exit through the center classifier, while coarse particles are thrown outward and exit through a channel within the periphery of the guide vanes. In the process, the coarse fraction is mixed with the incoming air to remove some of the entrained fines.

In the Mikroplex™ classifier, with or without rotating walls, the characteristic cut size is determined by the classifier diameter. Smaller cut sizes can be achieved as the diameter decreases. However, the maximum throughput allowed to maintain cut sharpness also decreases. The Alpine Mikroplex™ classifier was the first industrial-scale classifier to achieve cut sizes in the range of 10 $\mu$m with a reasonably high sharpness of cut. See Nied, R., "CFS-HD: a new classifier for fine classification with high efficiency," International Journal of Mineral Processing, Vol. 44–45, pp. 723–731 (1996). Variations of the Mikroplex™ spiral classifier are available from other manufacturers. In some, the wall rotational speed can be adjusted independently of the fan speed, or a secondary air stream is supplied with the feed stream to more evenly distribute the particles entering the classification zone.

The Bahco™ classifier is a well-known laboratory classifier with rotating walls. See Gustavson, K. E., Teknisk Tidskrift, Vol. 78, No. 10, pp. 667–670 (1948). It is used mainly to determine size distribution of particles in the range of approximately 1 to over 100 μm. The design and operation of the Bahco™ classifier are described in the American Society of Mechanical Engineers, Power Test Code 28: Determining the Properties of Fine Particulate Matter, New York (1985). Air is first pulled radially through a stack of closely spaced rotating disks to impart angular momentum to the air flow. From the disks, air exits axially into the rotating classification chamber. Particles are fed from a hopper above the classification zone using a vibrator and a rolling brush. The particles drop into a vertical tube, where they combine with a high-velocity air stream. The dispersed material falls through the tube into the axis of a narrow channel between two rotating plates. The material is conveyed radially outward through the channel by centrifugal force to a feed slot where it combines with the air stream leaving the rotating disks. Air and particles then enter the classification chamber, which is surrounded by rotating walls. Air and fine particles are pulled radially inward to the outlet at the center. Coarser particles are removed against the air by centrifugal force and are collected in a basin at the outer periphery of the classification zone. The rotational speed of all parts in the Bahco™ classifier is the same as the speed of the fan wheel above the classification zone that drives the air flow. A throttle at the air inlet controls air flow rate. By adjusting the throttle, different cut fractions can be obtained for determining particle size distribution. Because of the principle on which particle size is determined, the Bahco™ classifier is a recommended method for determining the collection efficiency of centrifugal air separators. See EPA Contract No. 68-D-98-026, Work Assignment No. 0-08, Stationary source control techniques for fine particulate matter (October 1998).

The performance of classifiers with a forced vortex is less dependent on particle loading than that of free vortex classifiers, because particle loading cannot diminish the angular momentum of the flow as much in a forced vortex. In essentially all counterflow centrifugal classifiers on the market, a forced vortex is generated by rotating vanes. In the rotor vane, or impeller wheel, classifier, particles dispersed in air pass radially through rotating vanes attached to a rotor. The vanes accelerate the flow tangentially. Coarser particles are collected from the air by centrifugal force. Finer particles are carried with the air through the vanes radially and exit through the center of the classifier. Cut size decreases with increasing rotor vane speed and decreasing air flow rate. Cut sizes for the rotor vane classifier range from about 1 or 2 to 30 μm. Cut sharpness, as well as cut size, tends to decrease as solids loading increases. The different rotor vane classifiers on the market differ mainly in the housing design and the way air and particles are introduced to the classifier.

It has been shown from velocity measurements with a Laser Doppler Anemometer that for radii less than the radius of the inner edge of the rotor vane, the flow becomes free vortex again. See Legenhausen, K., "Untersuchung der strömungsverhältnisse in einem abweiseradsichter," Dissertation, Technical University of Clausthal, Germany (1991). Therefore, air and fines should be withdrawn from the classifier immediately following the inner edge of the rotor vanes to maintain forced vortex flow throughout the classification zone. To achieve forced vortex flow between the vanes, the tangential velocity of the air at the outer edge of the rotor must have the same velocity as the outer edge of the rotor. See Leschonski, K., "Classification of particles in the submicron range in an impeller wheel air classifier," KONA, No. 14, pp. 52–60 (1996). If the velocities are different, vortices will form between the rotors, and the flow field will not be uniform. Typically, it is difficult to match these velocities. See Johansen, S. T. and de Silva, S. R., "Some considerations regarding optimum flow fields for centrifugal air classification," International Journal of Mineral Processing, Vol. 44–45, pp. 703–721 (1996).

An example of a rotor vane classifier is the Acucut™ classifier described by de Silva, S. R., "Centrifugal air classification for the production of fine powders," Journal of Powder and Bulk Solids Technology, Vol. 2, No. 2, pp. 3–12 (1978) and Luckie. P. T. and Klima. M. S., "Fundamentals of size separation," KONA, No. 18, pp. 88–101 (2000). In this classifier, air is pulled into the classifier from the bottom in the direction of the axis of rotation at a radius just outside the vanes. Particles enter perpendicular to the air stream and combine with the air before passing through the vanes. The rotor vanes are centrally located in the classifier in the axial direction and occupy nearly the entire height of the classifier. Air and fines exit through a tube at the axis of the classifier, while coarse particles exit tangentially.

Like the free vortex classifiers, many designs for rotor vane classifiers send the coarse fraction back into the incoming air to obtain a sharper cut. In one design tested by Austin, L. G. and Luckie, P. T., "An empirical model for air separator data", Zement-Kalk-Gips, Vol. 29, p. 452 (1976), the rotor vanes are located at the top of the classifier. Air is supplied from the bottom. The feed along with a secondary air stream enters the classifier perpendicular to the primary air stream. The combined streams travel upward to the rotor vanes. Air and fines pass though the vanes and exit at the top of the classifier. The coarse fraction falls back into the feed stream and is re-classified.

In the CFS-HD™ classifier, both free and forced vortex flow are used for classification. See Nied, R., "CFS-HD: a new classifier for fine classification with high efficiency," International Journal of Mineral Processing, Vol. 44–45, pp. 723–731 (1996). Stationary guide vanes surround the rotor vanes. Air is fed tangentially from outside the guide vanes, while particles are fed in the space between the guide vanes and the rotor. The purpose of the guide vanes is to create a flow of high shear in the region where particles are introduced to disperse the particles before entering the classification region. The coarse fraction exits tangentially within the periphery of the guide vanes. Air and fines pass through the rotor vanes into an internal, rotor-vane free area inside the rotor, where the flow is free vortex. To achieve more uniform radial velocity in the radial direction in this area, the height of the inside of the rotor was modified to increase as radius decreased. In addition, the air and fines outlet tube was made to rotate in the same direction as the rotor. The rotating outlet extends into the internal area to prevent coarse particles from being carried to the outlet by high radial velocities near the rotor walls. These two design changes resulted in a smaller cut size ($d_{50}$) for a given geometry and set of operating conditions. Cut sizes as low as 2 μm were achieved, although cut 10 sharpness ($K_{25/75}$) tended to decrease with decreasing cut size.

The MikroCut MC™ classifier is a recently developed rotor vane classifier that can operate with a centripetal acceleration of over 15,000×g. See Galk, J., Peukert, W., Krahnen, J., "Industrial classification in a new impeller wheel classifier," Powder Technology, Vol. 105, pp. 186–189 (1999). Because of this, cut sizes from below 1 to 20 μm for particle densities from 1000 to 4000 kg/m³ can be obtained. Air and particles enter the classifier together tangentially. A secondary air stream of varying flow rate can also be supplied tangentially to the classifier to improve separation of fines from the coarse fraction and to prevent particles from being collected before entering the classification zone. It has been shown that the MikroCut MC™ classifier gives significantly improved cut sharpness over the MikroClassifier CC™ classifier at a solids loading of 0.19 kg solids/kg air for a cut size below 10 μm. The fish-hook effect (a term used to describe the sudden increasing efficiency of particles below a certain size and the resulting appearance of the efficiency curve) was also reduced because of less fine particle agglomeration.

In one study, the effect of the inclination angle of the rotor vanes on classification performance was considered and angles of +30, 0, and −30° were tested. See Wang, X., Ge, X., Zhao, X., and Wang, Z., "Study on horizontal turbine classification," Powder Technology, Vol. 102, pp. 166–170 (1999). It was found that more negative angles gave smaller cut sizes, but more positive angles gave sharper cuts with less fish-hook effect. Therefore, an intermediate angle of 0° was recommended. It was believed that the increase in cut size with a more positive inclination angle was due to a transition from laminar to turbulent flow, which lowered the resistance for particles through the classification zone. The increased turbulence also helped to disperse the particles, resulting in higher cut sharpness. A model was developed to predict the fish-hook effect based on extent of agglomeration, which was predicted in terms of Van der Waals force between particles.

A two-phase (gas and solids) model was developed for a rotor vane classifier. See Wang, X., Ge, X., Zhao, X., and Wang, Z., "A model for performance of the centrifugal countercurrent air classifier," Powder Technology, Vol. 98, pp. 171–176 (1998). From this model, an equation was derived for cut size as a function of classifier geometry and operating parameters. Cut sizes obtained by experiment were compared with model predictions. The agreement between experiment and theory was reasonable. The deviation between the experiment and theory was attributed to incomplete dispersion of the particles, a non-uniform force field in the classification zone, the influence of size and shape of the feed material, and experimental error. The model was used to optimize the classifier design and operating parameters for a desired cut size.

A two-phase model was developed for an Acucut™ classifier using the commercial computational fluid dynamics (CFD) code, FLUENT™. See Johansen, S. T., Anderson, N. M., and de Silva, S. R., "A two-phase model for particle local equilibrium applied to air classification of powders," Powder Technology, Vol. 63, pp. 121–132 (1990). The flow was modeled as two-dimensional (assuming the angular velocity of the flow was constant), steady state, and turbulent using a version of the k-E model for two-phase flows. The particle phase was modeled by grouping the particles into a number of size classes. Particle-particle interactions were neglected. Flow fields and particle concentrations with and without particle-gas momentum and turbulence coupling were determined. The efficiency predicted by the model increased when particle-gas coupling was included. It was found that increasing particle concentration reduced the amount of turbulence. In addition, when particle loading was increased above a certain limit, the flow became unstable. To further investigate this phenomenon, it was recommended to model the flow as unsteady-state.

The above-described model was extended to three dimensions. See Johansen, S. T. and de Silva, S. R., "Some considerations regarding optimum flow fields for centrifugal air classification," International Journal of Mineral Processing, Vol. 44–45, pp. 703–721 (1996). The flow between two vanes was modeled using a rotating coordinate system. The flow simulations showed that it was difficult to achieve an ideal flow field for classification between the vanes. Two different inlet gas tangential velocities were considered: one equal to the vane velocity at the outer edge and the other about half this value. In both cases, flow separation occurred but in opposite directions. Addition of particles to the flow increased the amount of flow separation. Predicted efficiency curves were in reasonably good agreement with experimental data.

A problem with the rotor vane classifier is that the vanes tend to impact the particles, especially if the particles do not move at the same velocity as the air. This can cause significant particle attrition if the material being classified is fragile or breaks easily. Particle attrition has been studied in a rotor vane classifier. See Furukawa, T., Ito., M., Fujii, S., and Tanaka, H., "Comminution of particles in centrifugal air classifier," Proceedings of $2^{nd}$ World Congress PARTICLE TECHNOLOGY, Kyoto, Japan, pp. 104–111 (1990). As in the CFS-HD™ classifier, air passed through guide vanes before combining with the particle feed. Using four different feed materials, it was found that attrition increased with increase in rotor speed and air flow rate and with decrease in feed rate and distance between the guide vanes and rotor vanes. Attrition resulted in generation of particles in two size ranges: one in the micron and submicron range and the other in the range between 10 and 100 μm. It was believed that attrition was due to impaction of particles with each other, the wall, and the rotor vanes and turbulence. The increased attrition was also explained by the increased residence time of the particles in the classifier. Because of the decrease of fine particles in the coarse fraction as attrition increases, it was concluded that conditions that lead to attrition also contribute to dispersion.

As discussed hereinabove, some free vortex classifiers, like the Alpine Mikroplex™ classifier have rotating walls at the top and bottom of the classification zone to provide more uniform flow velocities in the axial direction. It has now been demonstrated by Applicants in the present disclosure that the use of rotating disks, instead of rotating walls or rotor vanes, to generate forced vortex flow in a centrifugal air classifier yields significant improvements in classification performance. Since the air flows radially through rotating disks, the disks will not impact the particles as do the rotor vanes. Thus, particle attrition is less.

FIG. 2 illustrates a boundary layer momentum transfer (BLMT) particle separator, generally designated 30, that has been developed by InnovaTech, Inc., and disclosed in U.S. Pat. No. 5,746,789 to Wright et al. as a radial inflow centrifugal filter device for separating fine particulates from fluid flow. The BLMT particle separator 30 uses a stack of closely spaced, rotating, coaxial, annular disks 35 to filter particles from a fluid. These rotating disks 35 are somewhat similar to those in the Bahco™ classifier, except that in the BLMT particle separator 30, particle separation occurs between the rotating disks 35. The disk annulus width is on the order of 25 times that of the disk spacing. Particle-laden fluid enters the device as indicated by arrow F. Since the bottom of the disk stack is closed, fluid is forced radially inward through disks 35 as indicated by arrows G, and exits axially though the center of the disk stack as indicated by arrow H. Momentum is transferred from disks 35 to the fluid in the boundary layer at each disk surface, accelerating the fluid tangentially. This causes coarser particles in the fluid to accelerate by centrifugal force radially outwardly, against the main radially inward flow. Smaller particles are carried with the air though disks 35. In accordance with the present invention, it is believed that the BLMT particle separator is well-suited for particle classification in part because of the forced vortex flow imposed by disks 35.

Bickert et al. implemented a principle somewhat similar to that of BLMT particle separator 30 to classify particles in a liquid, as reported in Bickert, G., Stahl, G., Bartsch, R., and Müller, F., "Grinding circuit for fine particles in liquid suspensions with a new counter-flow centrifugal classifier," *International Journal of Mineral Processing*, Vol. 44–45, pp. 531–534 (1996). Their classifier consisted of four, rotating annular disks. Unlike the BLMT particle separator 30, which has uniform disk spacing, the space between the rotating disks increases slightly as the radius decreases. This classifier was able to achieve a wide range of cut sizes for glass spheres by varying the radial fluid velocity, or fluid volumetric flow rate. The experimental cut size was defined as the $D_{99}$ of the fines, where $D_{99}$ is the particle diameter for which 99 volume % of the particles are smaller. At solids loading below 5 volume %, experimental cut sizes agreed very well with those predicted by equating the settling velocity in the centrifugal field to the radial fluid velocity. At higher loadings, cut size increased as the solids loading in the classification zone increased. They believe the higher solids loading reduced the settling rate by increasing the viscosity of the fluid. Although particles above the cut size were almost completely separated from those below, the coarse fraction still contained a significant amount of fines. They attributed the poor separation to particles being collected before being introduced to the classification zone. The results in this paper from Bickert et al. did not show the effect of varying centripetal acceleration (disk rotational speed) on cut size.

In view of the foregoing, it can be appreciated that new classification technology is required to meet the existing and future performance demands of the marketplace, particularly in the sharpness of the particle's cut size. Desired performance criteria include higher efficiencies, smaller size ranges of particles classified, a relatively low pressure drop across the device utilized for classification, and the potential for adaptation (i.e., retrofit) to existing classifiers.

DISCLOSURE OF THE INVENTION

According to the invention, a novel centrifugal classifier apparatus is provided that takes advantage of the boundary layer momentum transfer (BLMT) concept to greatly improve the efficiency of fine particle classification with lower particle attrition of friable particles. The classifier apparatus of the invention is durable, self-cleaning, and highly efficient across a wide range of particle sizes, thereby resulting in improved performance and reduced maintenance. In addition, the system parameters associated with the classifier apparatus are easily variable so that a wide range of particle sizes can be classified from the inlet air stream.

According to the invention, the classifier apparatus is provided with a BLMT particle separator assembly comprising rotating disks, and preferably with a novel inlet device as described hereinbelow in the form of several different embodiments. In this classifier apparatus, a particle-carrying fluid such as air is forced to flow radially inward between closely spaced, rotating, coaxial, annular disks. The disks accelerate the air tangentially, causing coarser particles to be removed by centrifugal force. Finer particles are carried with the air through the disks by the drag force exerted by a fluid moving device such as a blower situated either upstream or downstream of the BLMT particle separator device. Hence, the centrifugal force imparted to both the fluid and the particles causes the fluid and particles to be separated in opposite directions. Moreover, the centrifugal force is oriented in a direction opposite to that of the drag force. The classifier apparatus of the present invention differs from other forced vortex centrifugal classifiers in that it does not supply rotational momentum by collision of the particles with rotating vanes. Thus, classifier apparatus of the present invention is more effective in separating fragile particles without breaking them.

More specifically, the BLMT particle separator provided by the invention comprises a hollow-core stack of disks that can be rotated at several hundred to several thousand rpm. In combination with a fluid moving device such as a blower situated either upstream or downstream of the BLMT particle separator, the fluid pressure at the core of the BLMT particle separator is reduced and, consequently, outside fluid is drawn through the rotating disks. The rotation of the disks establishes a boundary layer on each side of every disk in the stack, thereby imparting rotation to the fluid and particles in the incoming fluid stream. A pressure drop across the disk stack from its outer edge to its inner edge is caused by the frictional losses of the outside fluid traversing through or near the boundary layer. The boundary layers and the pressure drop across the disk stack can be affected by a number of parameters, including disk size, the spacing between each disk, disk rotational speed, downstream pressure, ambient fluid conditions, and the like. Particle-laden fluid enters the classifier apparatus, enters the disk stack from the perimeter thereof, exits the disk stack through an open end thereof, and exits the classifier apparatus through an appropriate outlet.

When the outwardly directed centrifugal force balances the inwardly directed drag force on the particles, the particle cut size for the classifier apparatus is achieved. Angular momentum transfer from the rotating disks, effected by means of the intra-disk boundary layers established in the BLMT particle separator device, causes any particles above the cut size selected for the classifier apparatus that are entrained in the incoming fluid to be immediately expelled away from the perimeter of the BLMT particle separator device. The expelled particles are preferably retained in a collection component disposed below the BLMT particle separator device. As indicated hereinabove, particles smaller than the cut size follow the fluid streams through the rotating disks, into the central plenum defined by the disks, and out from the classifier apparatus, thereby effecting separation and classification of the particles of the incoming fluid stream.

The rotational requirement for the classifier apparatus of the invention can be provided by several different means, such as a small external electric or air-driven motor or other power means. Rotational power requirements are minimal due to relatively low boundary layer drag losses; rotating flat disks can easily sustain constant or substantially constant velocity with little power drain once accelerated to an appropriate operational speed.

The effects of disk rotational speed and inlet geometry, which effectively controls the tangential velocity of the air surrounding the disks, on classification performance were evaluated on embodiments of the classifier apparatus described in detail hereinbelow. Embodiments of the classifier apparatus have given sharp cuts for a wide range of cut sizes with both ideal glass spheres and non-ideal, industrial particles. It was initially expected that cut size would decrease monotonically with increasing disk speed because of higher centrifugal force on the particles. However, over a certain range of disk speeds, cut size increased with increasing disk speed. Further analysis demonstrated that disk rotation causes flow near the disk surface to reverse. To compensate for the reversed flow, the velocity radially inward at the center between the disks increases, increasing the drag force, which could explain the observed increase in cut size with increasing disk speed. As disk speed increases further, the flow becomes turbulent. Turbulence makes the velocity profile more uniform, reducing the reversed flow and thus the center radial velocity inward. More uniform velocity profiles are also in agreement with sharper cuts observed at higher disk speed.

According to one embodiment of the present invention, a radial inflow centrifugal apparatus for classifying a mixture of fine and coarse particles in a fluid stream by size or density comprises a housing, a boundary layer momentum transfer device, an inlet flow control mechanism, and a drive mechanism. The housing comprises an inlet, an interior chamber, a coarse particle outlet, and a fine particle outlet. The boundary layer momentum transfer device comprises a plurality of disks stacked in spaced, parallel relation in the interior chamber. The disks are rotatable about a disk axis. The disks have respective central openings cooperatively defining a plenum having a closed axial end and an opposing open axial end. The plenum communicates with spaces defined between each adjacent disk to cooperatively define a fine particle flow path from the interior chamber, through the spaces, through the plenum and the open axial end thereof, and to the fine particle outlet. The inlet flow control mechanism communicates with the interior chamber and provides an adjustable inlet flow path into the interior chamber. The drive mechanism is coupled to the boundary layer momentum transfer device to cause rotation of the disks.

According to a method of the present invention, a mixture of fine and coarse particles in a fluid stream are classified, wherein fine particles have a size or density below a predetermined cut size and coarse particles have a size or density above the cut size. A particle separation assembly is provided. The assembly comprises a housing and a boundary layer momentum transfer device. The housing comprises an inlet, an interior chamber, a coarse particle outlet, and a fine particle outlet. The boundary layer momentum transfer device comprises a plurality of disks stacked in spaced, parallel relation in the interior chamber, and which are rotatable about a disk axis. The disks have respective central openings cooperatively defining a plenum having a closed axial end and an opposing open axial end. The plenum communicates with spaces defined between each adjacent disk. A decreasing pressure gradient from the disk spaces to the plenum is created to establish a fine particle flow path through the inlet of the housing, the interior chamber, the disk spaces, the plenum, the open axial end of the plenum, and the fine particle outlet. A particle-laden fluid stream is flowed through the inlet of the housing into the interior chamber. A tangential velocity component of the fluid stream adjusting to promote uniform dispersion of particles in the fluid stream as the fluid stream flows around and toward the disks. The disks are rotated to eject coarse particles away from the disks, whereby fine particles are permitted to continue along the fine particle flow path to the fine particle outlet.

It is therefore an object of the present invention to provide a radial-flow, vaneless, centrifugal classifier apparatus characterized by novel structural features enabling advantageous particle classification performance.

It is another object of the present invention to provide a classifier apparatus characterized by improved discrimination of very fine particles over state-of-the-art classifier designs.

It is still another object of the present invention to provide a classifier apparatus and method that generate boundary layers on parallel, rotating disks to transfer momentum to particles suspended in an incoming flow of air rather than vanes.

It is yet another object of the present invention to provide a classifier apparatus that comprises a filtering device presenting no physical impediments or obstructions to fluid flow therethrough, thereby resulting in a desirable low pressure drop across the filtering device, which in turn reduces fluid moving energy demand and cost.

It is a further object of the present invention to provide a classifier apparatus that is inherently non-fouling, thereby significantly reducing requirements of maintenance.

It is a still further object of the present invention to provide a classifier apparatus that is mechanically simpler than vane-type classifier designs, and thus having a minimum of components, and which components are relatively low in cost, thereby further reducing the cost of maintenance and increasing economic life.

It is a yet further object of the present invention to provide a classifier apparatus and method capable of selectively removing particles from an incoming fluid stream based on the size or density of the particles by judicious choice of operating parameters that can be varied to change classification performance.

It is an additional object of the present invention to enhance classifier performance by providing a containment housing that includes a cyclone, cylinder, or scroll design.

Some of the objects of the invention having been stated hereinabove, other objects will become evident as the description proceeds when taken in connection with the accompanying drawings as best described hereinbelow.

DETAILED DESCRIPTION OF THE INVENTION

For the purposes of the present disclosure, the term "communicate" (e.g., a first component "communicates with" or "is in communication with" a second component) is used herein to indicate a structural, functional, mechanical, optical, or fluidic relationship, or any combination thereof, between two or more components or elements. As such, the fact that one component is said to communicate with a second component is not intended to exclude the possibility that additional components may be present between, and/or operatively associated or engaged with, the first and second components.

As used herein, the term "fluid" is taken to mean any quantity of matter that is not predominantly a solid. While a solid can resist the application of a shear stress by static deformation, a fluid cannot do so. As long as a fluid is subjected to a shear stress, the fluid will respond by moving and/or deforming. Thus, the term "fluid" encompasses, by way of example, flowable media such as liquids, vapors, and gases. Moreover, the term "fluid" encompasses mixtures of liquids, vapors, and gases with solid particulate matter, as in the case of particles entrained in a gas (e.g., air) stream.

Figure 1:
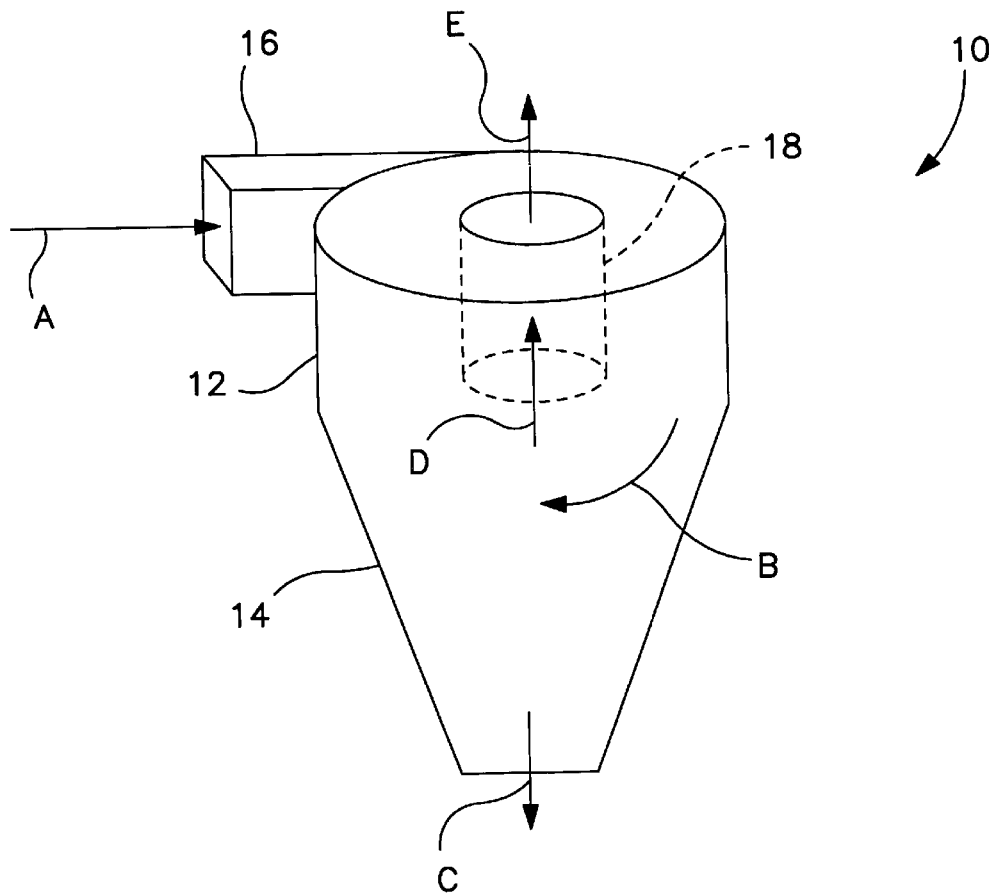
FIG. 1 is perspective view of a conventional gas cyclone.
Figure 2:
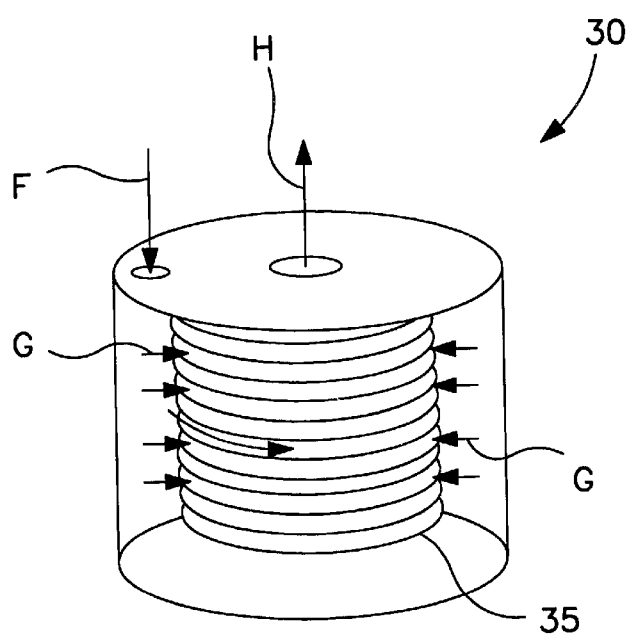
FIG. 2 is a perspective view of a boundary layer momentum transfer filter utilized in accordance with the present invention.
Figure 3:
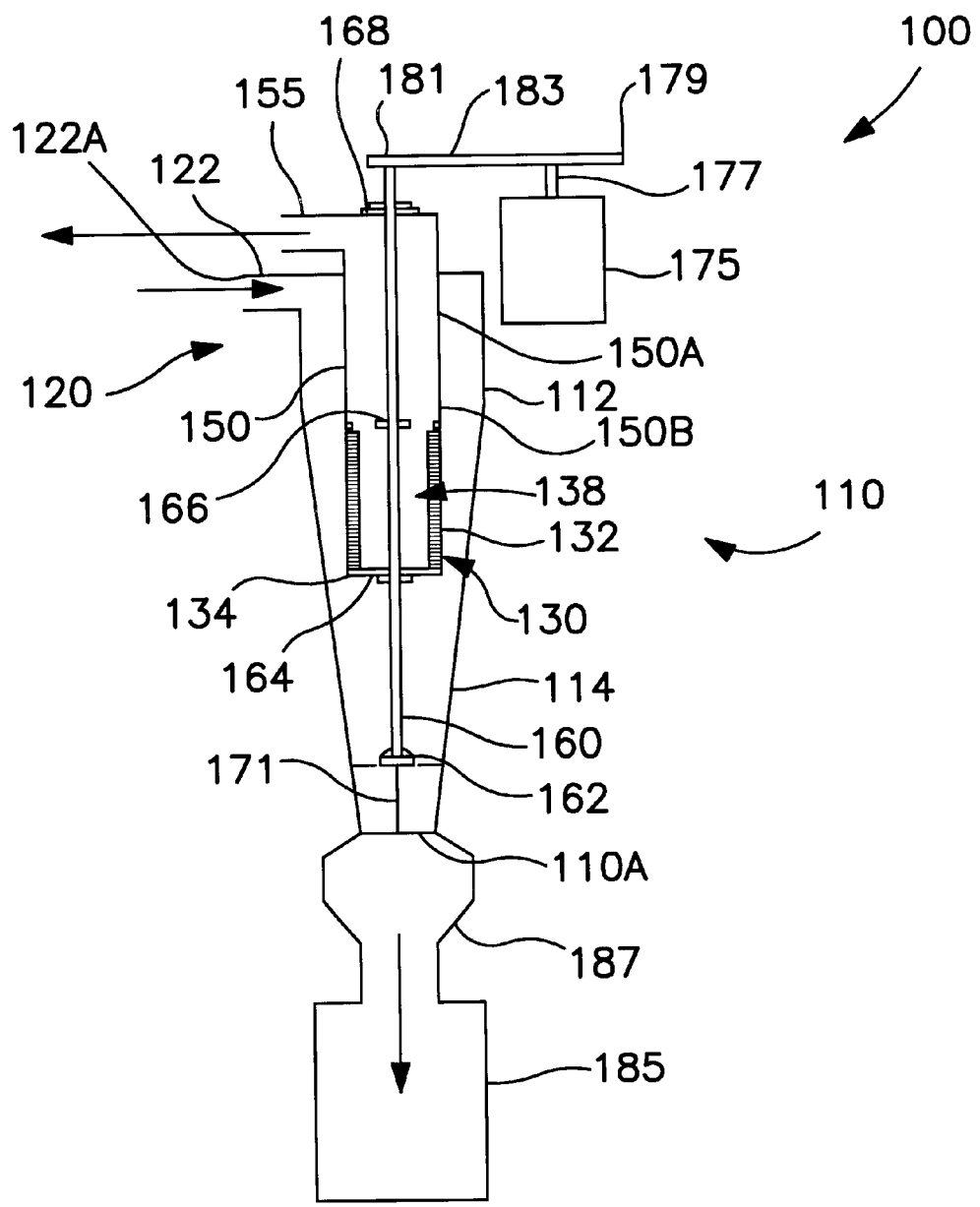
FIG. 3 is a vertical elevation view in partial cross-section of a particle classifying apparatus provided in accordance with the present invention.

Referring now to FIG. 3, a particle classification apparatus, generally designated 100, is illustrated in accordance with one embodiment of the invention. Classifier apparatus 100 generally comprises a BLMT particle separator, generally designated 130, disposed within the confines of an appropriate housing generally designated 110. Housing 110 can be generally cylindrical or, preferably, includes an upper cylindrical section 112 and a lower conical section 114 as shown in FIG. 3, and serves as a gas cyclone. Housing 110 fluidly communicates with a fluid inlet device, generally designated 120, comprising cylindrical section 112 and an inlet structure 122. Inlet structure 122 has an inlet aperture 122A for admitting an appropriate fluid such as air and particles into housing 110. Alternatively, two inlet structures (not shown) can be provided to admit separate fluid and particle streams. BLMT particle separator 130 generally comprises a stack of annular, rotatable disks 132 supported between a solid bottom plate 134 and a spoked top plate 136 (see FIGS. 4 and 5). Alternatively, the bottommost disk of the stack of disks 132 could serve as bottom plate 134 and the topmost disk could serve as top plate 136. The central openings of disks 132 collectively define a hollow disk plenum, generally designated 138.

A vortex finder, generally designated 150, is disposed above BLMT particle separator 130, preferably with an annular brush seal 152 providing a sealed interface therebetween. By this configuration, air and particles entering classifier apparatus 100 must pass through BLMT particle separator 130 in order to exit classifier apparatus 100. Preferably, vortex finder 150 is cylindrical and has an outer diameter approximately equal to that of BLMT particle separator 130. In addition, vortex finder 150 preferably includes an upper section 150A and a lower section 150B that slide with respect to each other so that vortex finder 150 has an adjustable height, thereby enabling variation of the axial position of BLMT particle separator 130 with respect to housing 110. A fluid outlet section 155 fluidly communicates with vortex finder 150 and serves as a fine particle outlet. Inlet device 120 is disposed concentrically around vortex finder 150 and/or outlet section 155.

The stack of disks 132, vortex finder 150, outlet section 155, housing 110, and inlet device 120 are arranged concentrically around a main shaft 160 around which shaft bearings 162–168 are press-fitted. Shaft bearing 164 supports support plate 134, shaft bearing 162 is supported by a bearing cross-support 171, shaft bearing 166 bears against top plate 136, and shaft bearing 168 bears against an outer surface of outlet section 155. Bearing cross-support 171 is configured to straighten fluid flow passing therethrough. Main shaft 160 is supported by bearing cross-support 171 and extends through an opening in outlet section 155. Main shaft 160 is powered by an appropriate power and transmission arrangement such as, for example, a motor 175 that transfers rotational energy to main shaft 160 through a motor shaft 177, a pulley 179 connected to motor shaft 177, a pulley 181 connected to main shaft 160, and an endless belt or chain 183 operatively engaged with pulleys 179 and 181. Preferably, motor 175 is a variable-drive device.

At a lower outlet 110A of housing 110, housing 110 fluidly communicates with a chamber serving as a coarse fraction collector 185. Preferably, a vortex breaker 187 is interposed between housing 110 and coarse fraction collector 185 so that the movement of coarse particles into coarse fraction collector 185 is not impeded.

Figure 4:
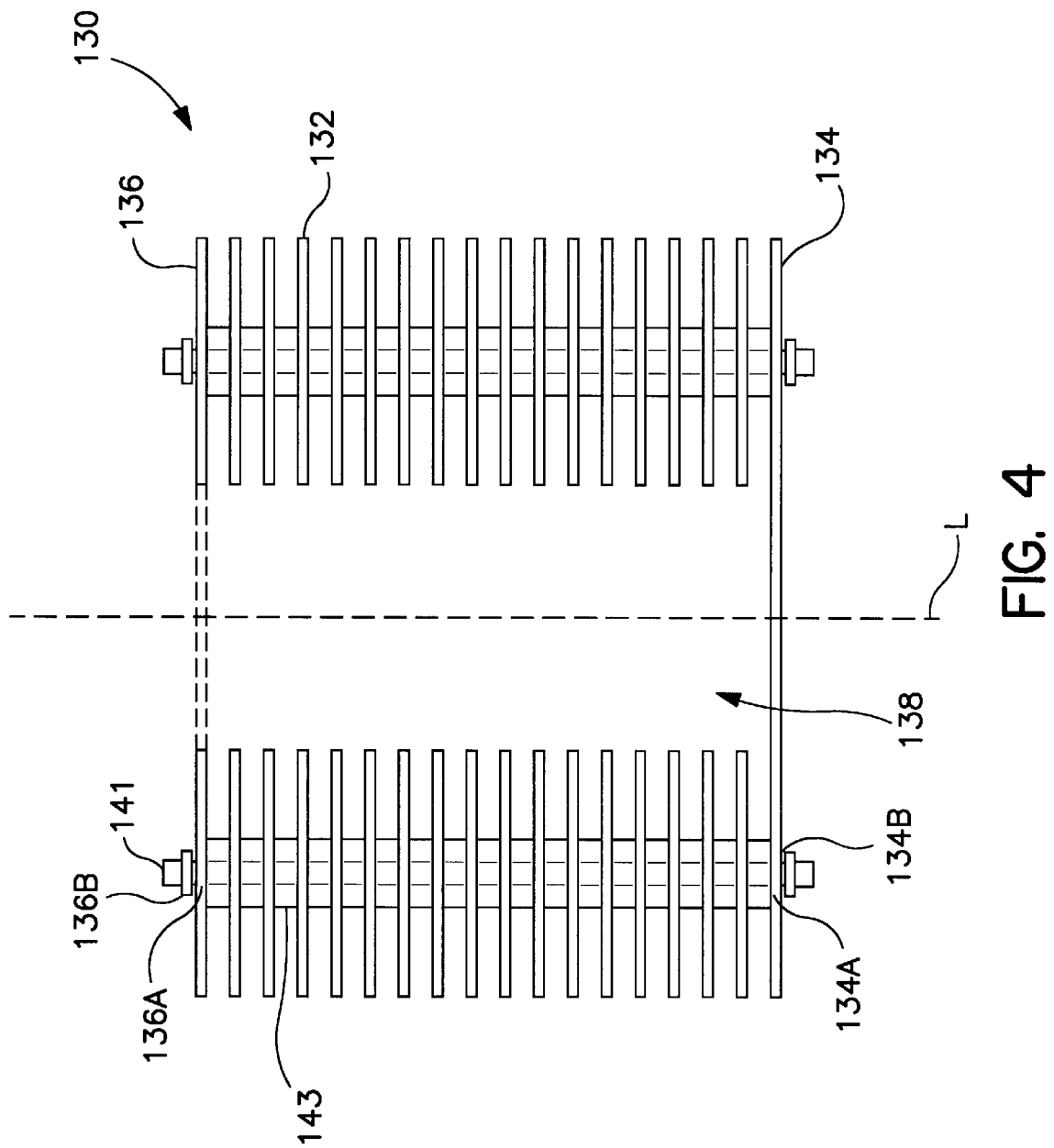
FIG. 4 is a cutaway view of a boundary layer momentum transfer filter provided in accordance with the present invention.

Referring to FIG. 4, top plate 136 and bottom plate 134 of BLMT particle separator 130, between which the plurality of disks 132 are stacked, include a plurality of holes 136A and 134A (e.g., eight holes), respectively, through which a corresponding plurality of rods 141 extend along the axial direction of disks 132. Rods 141 are secured to top and bottom plates 136 and 134 by suitable fastening means, such as nuts 136B and 134B, respectively, to mechanically connect top and bottom plates 136 and 134, and thus disks 132, to main shaft 160 (see FIG. 3). Preferably, holes 134A and 136A and rods 141 are spaced equally apart in relation to a central longitudinal axis L of BLMT particle separator 130, and are located approximately halfway across the annulus of each disk 132. Along the axial direction of BLMT particle separator 130, disks 132 are fixed in a spaced apart relation to each other by a plurality of spacers 143, such as washers, collars or annular structures, interposed between each adjacent disk 132.

Figure 5:
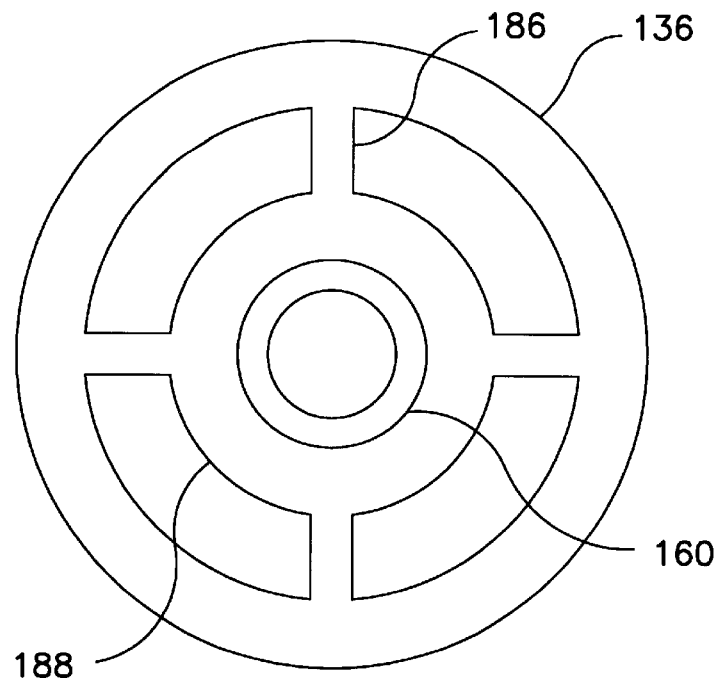
FIG. 5 is a top plan view of a spoked plate utilized in conjunction with the apparatus illustrated in FIG. 3.

FIG. 5 is a plan view of top plate 136 (or topmost disk) and illustrates a centrally disposed spoked configuration. If more stability is needed for the stack of disks 132, one or more of disks 132 can also be provided with a spoked configuration such as shown in FIG. 5. In FIG. 5, the spoked configuration comprises four spoke sections 186 and a central hub section 188 through which main shaft 160 passes. One suitable embodiment of BLMT particle separator 130, for example, contains a stack of 200 disks 132 of which the 67$^{th}$ and 133$^{rd}$ disks from the top disk are spoked for added structural stability.

The combination of BLMT particle separator 130 and housing 110 in classifier apparatus 100 greatly improves classification of particles. On the one hand, BLMT particle separator 130 improves the classification performance of housing 110 by adding forced vortex flow the classification region within housing 110. On the other hand, housing 110 improves the classification performance of BLMT particle separator 130 by providing a more uniform radial velocity in the axial direction at the outer radii of disks 132, assuming disks 132 do not appreciably alter the flow pattern in housing 110. For the embodiment in which housing 110 is conical, housing 110 and vortex finder 150 (adjusted to an appropriate length) cooperate to provide a nearly uniform radial velocity in the axial direction at the outer radii of disks 132, which is desirable in obtaining a sharp separation cut. Housing 110 also serves the practical purpose of pre-filtering the very coarse particles and providing a means to collect the coarse fraction.

In order to circulate a fluid such as particle-laden air through classifier apparatus 100, it will be understood that a fluid moving means such as a blower (not shown) is located either upstream of inlet section 120 to develop positive pressure or downstream of outlet section 155 to develop negative pressure. For purposes of the present disclosure, the operation of classifier apparatus 100 will be described with the assumption that a downstream blower is provided, with the understanding that an upstream blower is equally applicable.

The operation of classifier apparatus 100 will now be described with reference being made generally to FIGS. 3–5. Motor 175 imparts rotary motion to the stack of disks 132. While disks 132 are rotating, the blower pulls particle-laden air through inlet device 120 and into the interior of housing 110, radially through the spaces between disks 132, axially through disk plenum 138 and vortex finder 150, and through outlet section 155. The suction of the blower causes a pressure drop in disk plenum 138. The reduced pressure differential created between disk plenum 138 and the entrances at the outer perimeter of disks 132 causes air to flow between the disk spaces. The rotational motion of disks 132 causes the development of boundary layers on each side of each disk 132. These boundary layers impart momentum to the particle-laden air attempting to enter the perimeter of disks 132. The resulting centrifugal force acting on the particles and the air is in a direction opposite the drag force on the particles. Particles above the designed cutoff size have sufficient momentum to overcome the drag force and consequently are ejected from the rotating air stream back into housing 110, while the resulting mixture of classified particles and the air in which the classified particles are entrained enters between the spinning disks 132 into disk plenum 138 and is then drawn though outlet section 155 to, for instance, a downstream collection chamber (not shown). The larger (i.e., coarse) rejected particles are deposited into coarse fraction collector 185 disposed underneath BLMT particle separator 130 under the influence of gravity. It can thus be seen that classifier apparatus 100 separates the larger particles from the air directed through BLMT particle separator 130 by taking advantage of the difference in the forces acting on the air and the particles. However, the drag forces of the air entering BLMT particle separator 130 acting on the smaller particles are greater than the centrifugal forces encountered at the boundary layers. As a result, the smaller particles follow the airflow streams between disks 132 and exit classifier apparatus 100.

The design parameters characterizing classifier apparatus 100 significantly influence the classification efficiency and pressure drop across BLMT particle separator 130. For a given inlet mass flow rate (defined by the blower), the particle size eliminated from classifier apparatus 100 can be decreased by either increasing the size of disks 132 or increasing the rotational velocity of disks 132. For particles larger than the designed cutoff size, the momentum transferred to the particles through the rotating boundary layers is sufficient for ejection from the primary flow streams between the rotating disks 132. Any fine particles below the designed cutoff size will pass through classifier apparatus 100.

Figure 6:
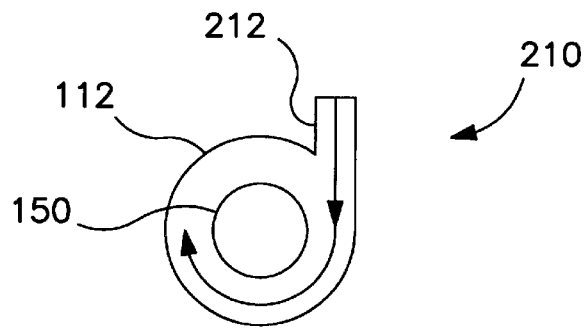
FIG. 6 is a cross-sectional view of an inlet control mechanism provided in accordance with one embodiment of the present invention.

The design of inlet device 120 of classifier apparatus 100 can significantly affect the classification performance of classifier apparatus 100. Referring to FIG. 6, a tangential or involute inlet device, generally designated 210, has an inlet structure 212 tangentially oriented in relation to cylindrical section 112 of housing 110. The tangential inlet design is provided to maximize the angular velocity of the airflow in housing 110 and thus the resulting centrifugal force that removes particles from the air. While this inlet device 210 is suitable for conventional particle collection, it is not a preferred embodiment of the present invention where it is desired to classify particles as opposed to simply collecting particles. When tangential inlet device 210 is incorporated into a conventional cyclone, the cyclone can provide only a single cut size for a given fluid flow rate and cyclone geometry.

Figure 7:
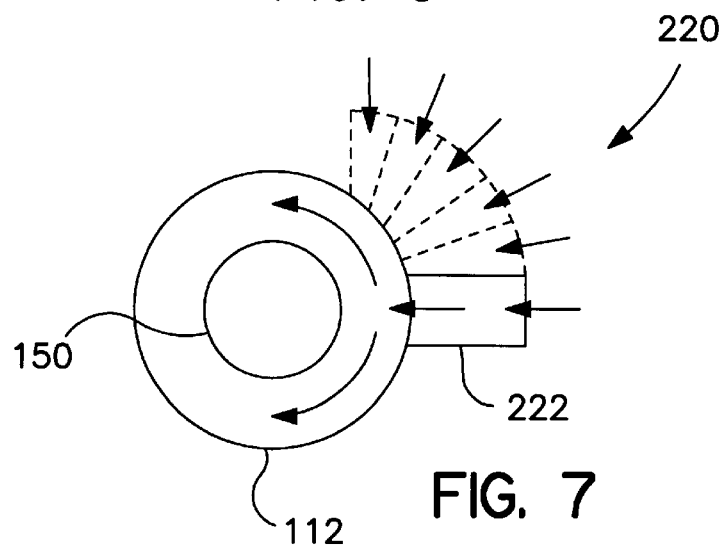
FIG. 7 is a cross-sectional view of an inlet control mechanism provided in accordance with another embodiment of the present invention.

Accordingly, another embodiment of the invention is illustrated in FIG. 7, in which an adjustable angle inlet device, generally designated 220, is provided. Adjustable angle inlet device 220 enables control of the tangential fluid velocity of the air at the outer radii of disks 132 by utilizing an inlet structure 222 whose angle (and thus the angle of the air stream entering housing 110 through inlet structure 122) is adjustable from 0° (normal) to 90° (tangential). The angle can be varied by providing a flexible inlet structure 222 (with, for example, a bellows) or by providing a replaceable inlet device 220 (i.e., selecting from a plurality of inlet devices 220 having differently angled inlet structures 222). The centrifugal force that drives particle rejection is a function of the tangential fluid velocity at the outer radii of disks 132. As just described, the tangential fluid velocity can be adjusted in accordance with this embodiment by controlling the inlet angle, as well as the angular velocity of spinning disks 132. By adjusting the inlet angle and disk velocity, the operator of classifier apparatus 100 can realize a wide range of cut sizes.

Figure 8:
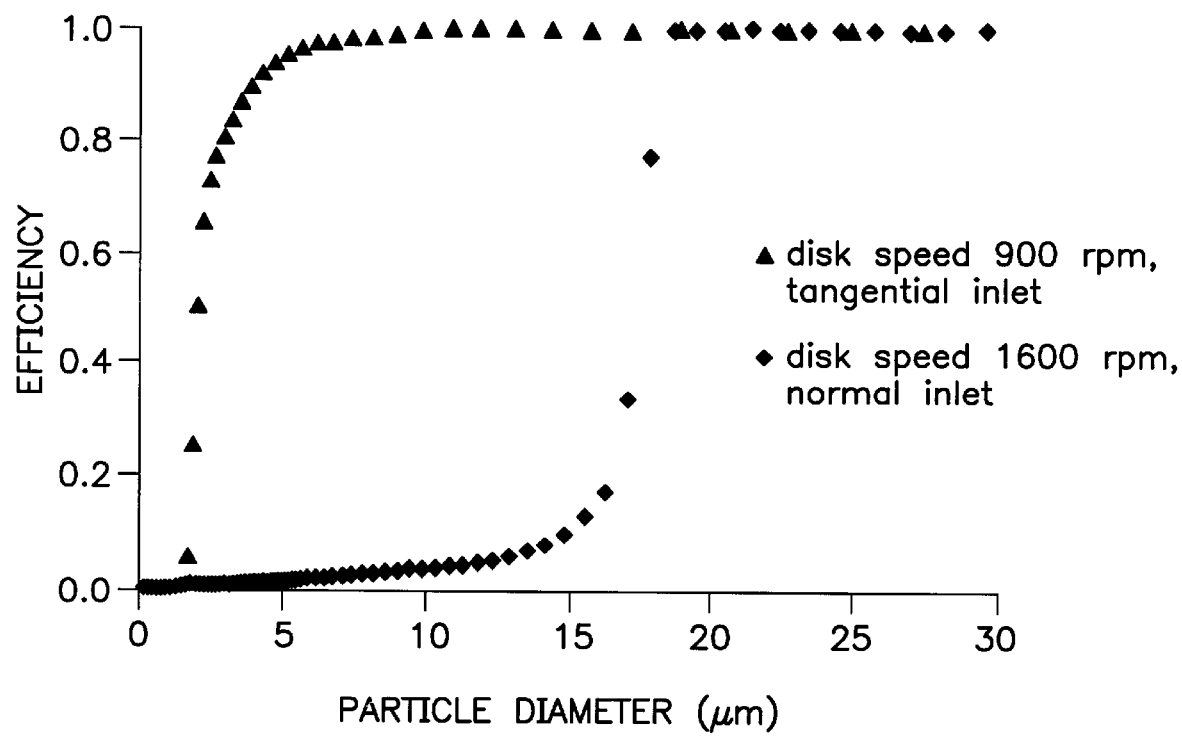
FIG. 8 is a plot of efficiency as a function of particle diameter for different inlet flow angles demonstrating classification performance utilizing the inlet control mechanism illustrated in FIG. 7.

FIG. 8 illustrates the results of a classification test performed using classifier apparatus 100 equipped with adjustable angle inlet device 220 set at its two extreme angular positions (or, equivalently, classifier apparatus 100 equipped with a normal angle inlet device 220 in one test run and a tangential angle inlet device 220 in another test run). FIG. 8 is plot of efficiency versus particle diameter, where efficiency is the percentage of particles of a particular size that were collected in coarse fraction collector 185, and the dimension of particle diameter is scaled in microns. As indicated in FIG. 8, disk velocity was set at 900 RPM for the tangential inlet configuration and 1600 RPM for the normal inlet configuration. The particle-laden fluid processed by classifier apparatus 100 comprised glass beads carried in air. From this plot, it can be seen that classifier apparatus 100 can sharply separate glass beads in the range of approximately 2 to approximately 17 μm.

Figure 9:
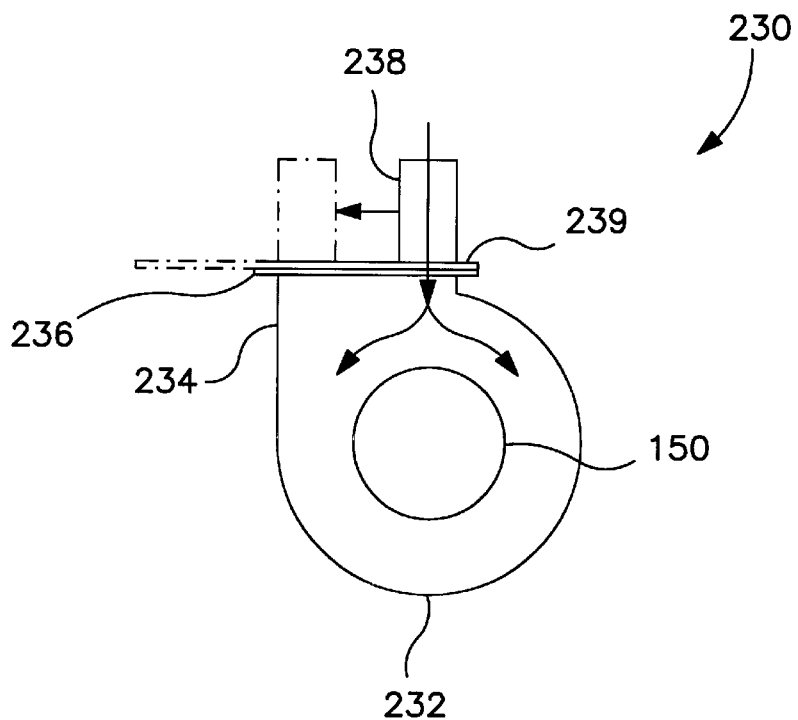
FIG. 9 is a cross-sectional view of an inlet control mechanism provided in accordance with still another embodiment of the present invention.

Referring now to FIG. 9, a more specific example is illustrated of an implementation of adjustable angle inlet device 220 shown in FIG. 8. In FIG. 9, a sliding inlet device, generally designated 230, inlet section 112 of housing 110 comprises a circular section 232 and a housing/sliding inlet interface 234 having a straight cross-section. Interface 234 terminates at an open flange 236. Sliding inlet device 230 further comprises a sliding inlet structure primarily including an inlet conduit 238 attached to a base plate 239. Base plate 239 is slidably engaged with flange 236 by conventional means, and has an aperture (not specifically shown) to enable fluid communication from inlet conduit 238 to housing 110. Sliding inlet device 230 is adjustable between the extreme normal and tangential positions. The tangential position of inlet conduit 238 is indicated in FIG. 9 by phantom lines. Base plate 239 is long enough to ensure that flange 236 is fluidly sealed from the environment surrounding inlet conduit 238 and its aperture at all positions of inlet conduit 238.

Figure 10:
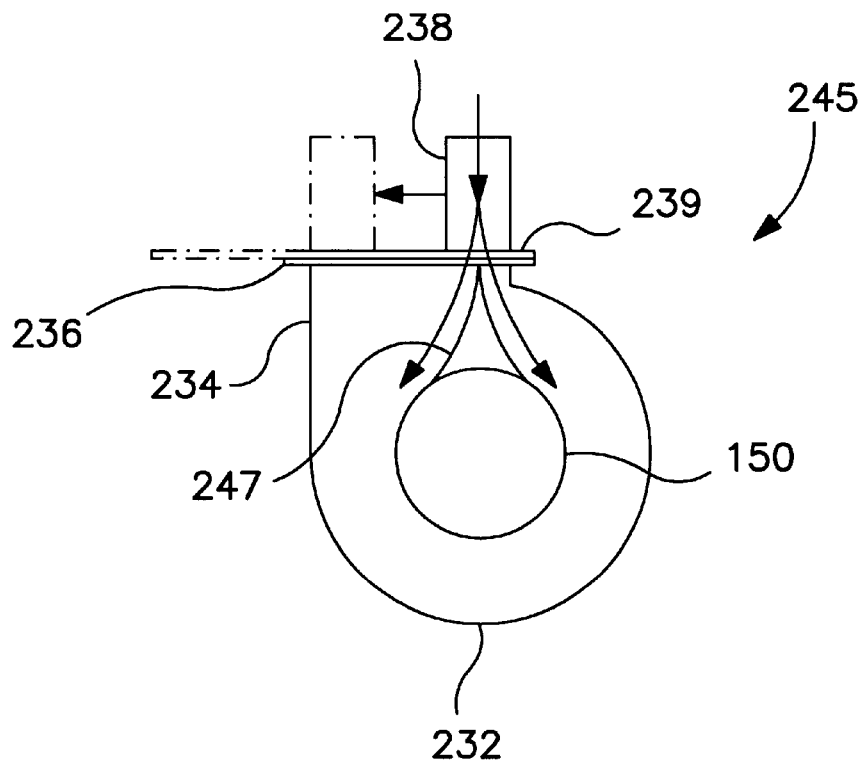
FIG. 10 is a cross-sectional view of an inlet control mechanism provided in accordance with yet another embodiment of the present invention.

Referring now to FIG. 10, a modified adjustable angle inlet device, generally designated 245, is illustrated in accordance with an alternative embodiment of the invention. The modification comprises a streamlined flow divider 247 conformally attached to vortex finder 150 and extending to housing/sliding inlet interface 234. The height of flow divider 247 is the same as the diameter of inlet conduit 238. The use of modified adjustable angle inlet device 245 has been observed to produce more repeatable results as compared with adjustable angle inlet device 230 illustrated in FIG. 9.

Figure 11:
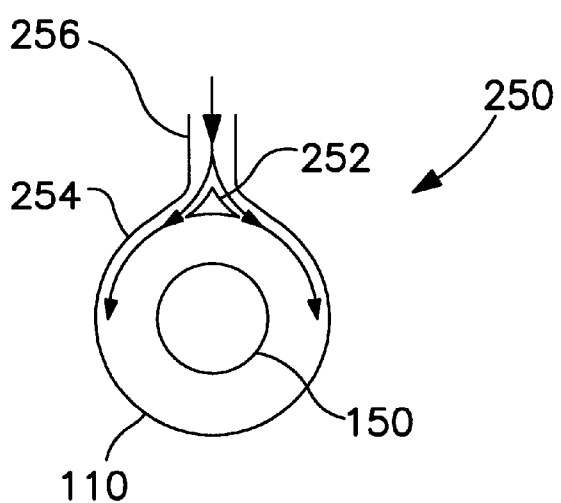
FIG. 11 is a cross-sectional view of an inlet control mechanism provided in accordance with a further embodiment of the present invention.

Referring now to FIG. 11, another embodiment of the invention is illustrated, in which a split-flow inlet device, generally designated 250, is provided to enable different cut sizes without requiring the flow rate to be changed. Split-flow inlet device 250 comprises a flow splitter 252 disposed at an interface 254 between an inlet conduit 256 and housing 110. Interface 254 is illustrated by way of example as a transitional structure connecting the respective walls of inlet conduit 256 and housing 110. In use, incoming fluid is split by flow splitter 252 into two fractions, both of which enter housing 110 at an approximately 45° angle but in opposing directions (i.e., from the perspective of FIG. 11, in the clockwise and counterclockwise directions). In FIG. 11, flow splitter 252 is illustrated as being centrally located with respect to the cross-section of inlet conduit 256. However, flow splitter 252 is preferably made adjustable by conventional mechanical means to positions to the left and right of the illustrated central position. In this manner, the flow split ratio can be varied. As used herein, the flow split ratio is defined as the flow rate of the fluid stream entering housing 110 in the clockwise direction divided by the flow rate of the other fluid stream entering housing 110 in the counterclockwise direction. Flow splitter 252 can be adjusted to control and vary this flow split ratio over its full range, i.e., between 0 and 1.

Figure 12:
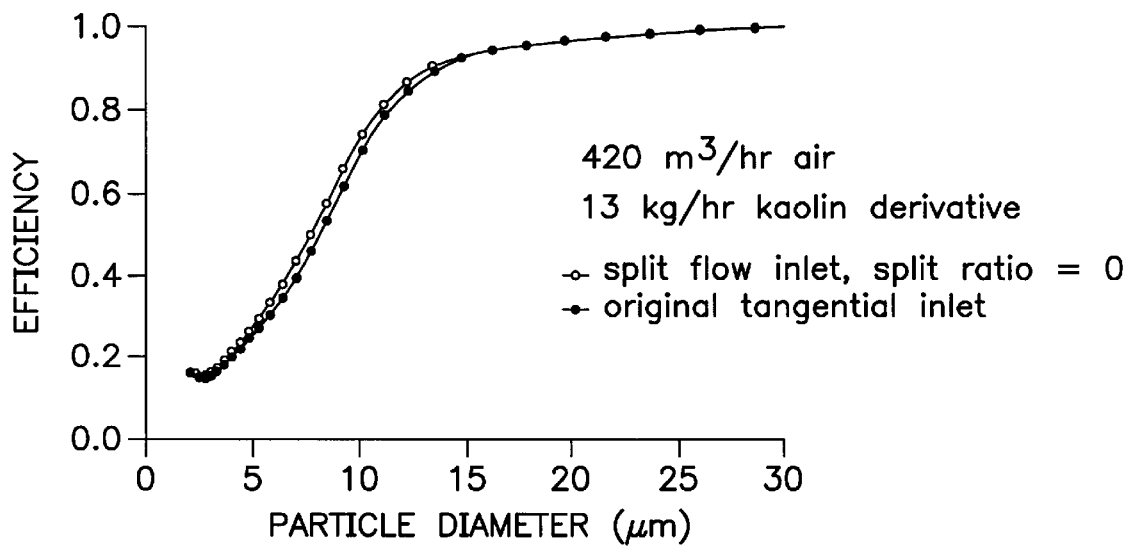
FIG. 12 is a plot of efficiency as a function of particle diameter demonstrating classification performance utilizing the inlet control mechanism illustrated in FIG. 11 as compared to performance utilizing the inlet control mechanism illustrated in FIG. 6.

With flow splitter 252 positioned at the center of inlet conduit 256, as shown in FIG. 11, the flow split ratio is 1, and the respective flow rates of the two divided fluid streams are approximately equal. For a flow split ratio of 1, the angular velocity of air in housing 110 should be approximately 0 and result in the lowest collection efficiency for classifier apparatus 100. If flow splitter 252 is moved all the way to the right, the flow split ratio becomes 0 (tangential co-spin) and the angular velocity of fluid is at its maximum in the direction of the spinning disks. If the flow splitter 252 is moved all of the way to the left, the flow split ratio becomes∞ (tangential counter spin) and the angular velocity of the fluid is at a maximum in the direction opposite to the spinning disks. For a flow split ratio of 0, the efficiency of classifier apparatus 100 has been observed in at least one case to be essentially the same as that obtained using conventional tangential inlet device 210 illustrated in FIG. 6. This observation is illustrated in FIG. 12, which compares the classification performance of classifier apparatus 100 equipped with tangential inlet device 210 and split-flow inlet device 250, respectively. For the test corresponding to FIG. 12, an industrial kaolin derivative (SG~0.9) was employed as the particle material and air was employed as the conveying fluid. The kaolin derivative entered classifier apparatus 100 at a flow rate of 13 kg/hr, carried by air at 420 m³/hr.

Figure 13:
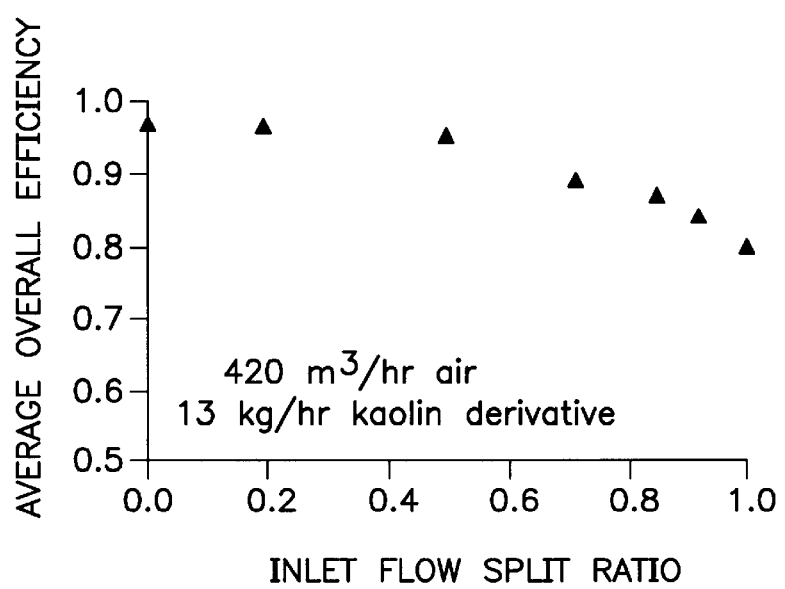
FIG. 13 is a plot of average overall efficiency as a function of inlet flow split ratio demonstrating classification performance utilizing the inlet control mechanism illustrated in FIG. 11.

Referring to FIG. 13, the average overall efficiency (i.e., the overall weight fraction of particles collected) of classifier apparatus 100 equipped with split-flow inlet device 250 was plotted as a function of inlet flow split ratio. The kaolin derivative entered classifier apparatus 100 at a flow rate of 13 kg/hr, and the air entered at 420 m³/hr. For the constant air flow rate, as the flow split ratio was increased from 0 to 1, or effectively, as the angular velocity of air in housing 110 was decreased, the overall efficiency decreased from 97 to 80%. Because the transition from highest to lowest efficiency was fairly smooth, as shown in FIG. 13, an intermediate efficiency can be achieved by properly adjusting the flow split ratio.

Figure 14:
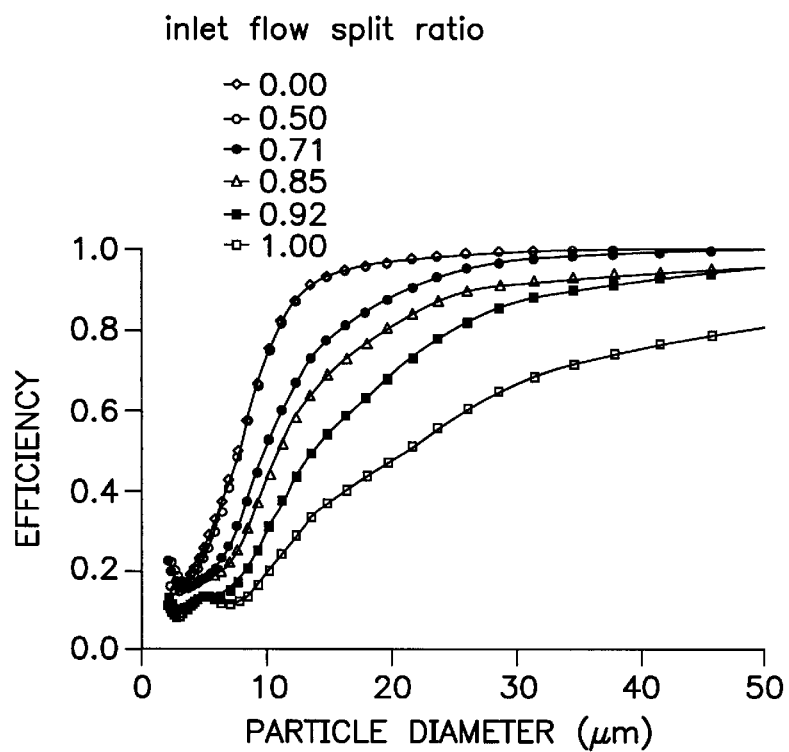
FIG. 14 is a plot of efficiency as a function of particle diameter for different inlet flow split ratios demonstrating classification performance utilizing the inlet control mechanism illustrated in FIG. 11.

Referring to FIG. 14, efficiency as a function of particle size is plotted for different flow split ratios. At each flow split ratio, the kaolin derivative entered classifier apparatus 100 at a flow rate of 13 kg/hr and the air entered at 420 m³/hr. As the flow split ratio was increased from 0 to 1, cut size increased almost three-fold. However, the cut sharpness (i.e., the steepness of the efficiency curve) decreased as the flow split ratio increased. The cut sharpness can be quantified by the value K, which is the ratio of particle size collected with 25% efficiency ($d_{25}$) to that with 75% efficiency ($d_{75}$). It can then be observed that the closer the ratio K is to 1, the sharper is the cut. The data obtained from FIG. 14 is presented in TABLE 1, set forth hereinbelow, to more clearly indicate the effect of inlet flow split ratio on cut size ($d_{50}$) and cut sharpness (K) in classifier apparatus 100. It can be seen that the cut sharpness K tends to decrease as the cut size $d_{50}$ increases.

TABLE 1

| inlet flow split ratio | $d_{50}$ (μm) | $\kappa = d_{25}/d_{75}$ |
|---|---|---|
| 0 | 8.0 | 0.45 |
| 0.50 | 8.0 | 0.50 |
| 0.71 | 10 | 0.53 |
| 0.85 | 11 | 0.44 |
| 0.92 | 14 | 0.41 |
| 1 | 21 | 0.28 |

EXPERIMENTAL DISCUSSION 1

Referring back to FIGS. 3–5, an example of an implementation of the present invention will now be described. A classifier apparatus 100 was constructed with a 510 m³/hr (300 ft³/min) nominal capacity housing 110 from Kice Industries. Housing 110 has a cylinder-on-cone geometry with dimensions given in TABLE 2 hereinbelow. Bearing cross-support 171 extends 152 mm (6 in) into housing 110 from its apex.

TABLE 2

| Dimension | Length (mm) | Length (in) |
|---|---|---|
| Total height | 1219 | (48) |
| Cylindrical height | 279 | (11) |
| Cylindrical diameter | 381 | (15) |
| Apex diameter | 152 | (6) |
| Vortex finder diameter | 191 | (7.5) |
| Vortex finder height | 203 to 381 | (8 to 15) |
| Inlet height | 76 | (3) |
| Inlet width | 76 | (3) |

BLMT particle separator 130 consists of 200 aluminum disks 132 with a 0.20 m (8 in) outer diameter and a 0.15 m (6 in) inner diameter. Disks 132 are perforated with eight holes spaced equally apart in the angular direction for holding disks 132 together with rods 141. The holes are located halfway across the disk annulus. Disks 132 are spaced 0.97 mm apart using washers 143, which are located on each of the eight rods 141. Rods 141 connect disks 132 to top plate 136 and bottom plate 134, which are attached to the rotating shaft 160. Bottom plate 134 is solid, while top plate 136 is spoked with four spokes 186 as shown in FIG. 5. Initially, disk thickness was 0.39 mm but later was increased to 0.50 mm to improve rotational stability of the disk pack. In addition, two spoked disks with four spokes 186 were added to the disk pack, one 67 disks in and the other 133 disks from the top disk. Experiments were run with the top disk of the disk stack approximately 394 mm (15.5 in.) from the top of cylindrical section 112 of housing 110 (i.e., a constant vortex finder height).

Figure 15:
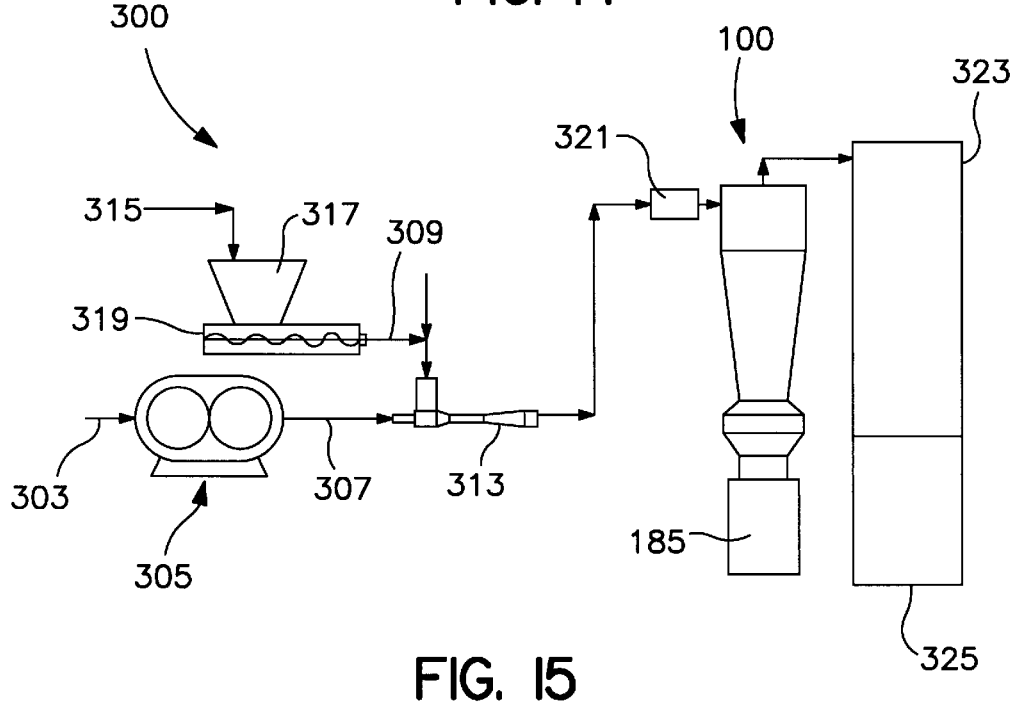
FIG. 15 is a schematic view of a blower-based particle classification system incorporating the apparatus illustrated in FIG. 3.
Figure 16:
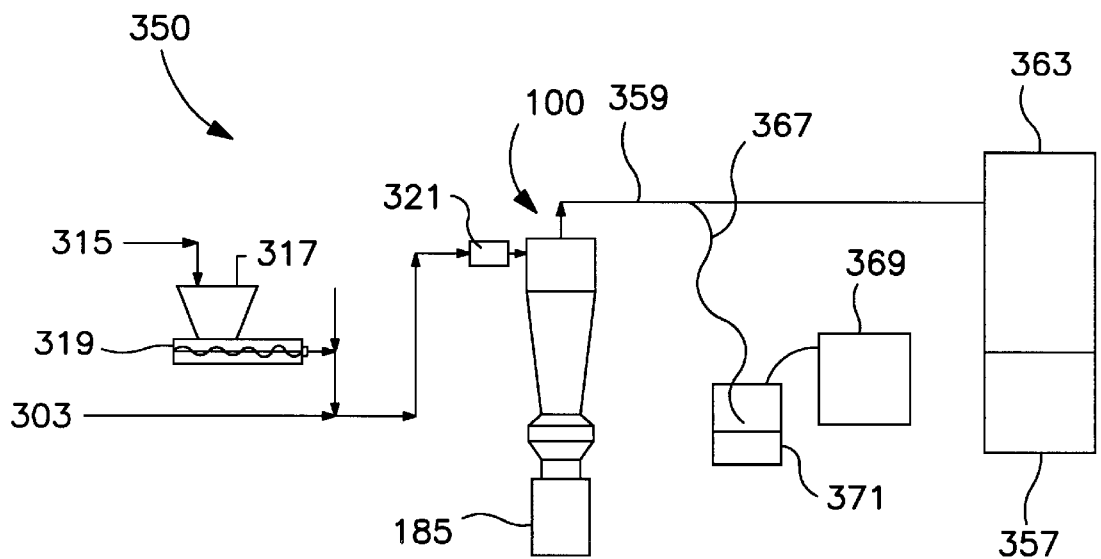
FIG. 16 is a schematic view of a vacuum-based particle classification system incorporating the apparatus illustrated in FIG. 3.

Referring now to FIG. 15, one experimental set-up comprised a blower-based particle delivery system, generally designated 300. In this system 300, air 303 was supplied by a positive displacement-type blower 305 through a 76 mm (3 in.) ID duct 307 to classifier apparatus 100. Blower 305 provided a constant air flow rate for varying downstream pressure. The air stream combines with a particle feed stream 309 when the air stream passes through a venturi eductor 313. Here, the air stream is accelerated to high velocity in the nozzle of venturi eductor 313. Particles 315 loaded in a hopper 317 drop from a screwfeeder 319 into venturi eductor 313. The vacuum created by the nozzle draws particles into the air stream. The air stream carries the particles first to a disperser 321 and then to classifier apparatus 100. Particles leaving the top of classifier apparatus 100 with the air as the fine fraction are collected in a filter bag 323 attached to a sealed drum 325. Particles leaving the bottom of classifier apparatus 100 as the coarse fraction are collected in coarse fraction collector 185, which in this case constituted a sealed drum.

For dispersing the particles before classification, disperser 321 was initially developed as a mechanical particle disperser comprising a motor-driven mixing blade (not shown) whose axis was parallel to the air flow. However, because of mechanical problems with this device, the mechanical particle disperser was subsequently replaced with a simpler static mixer. Although it is believed that the mechanical particle disperser is better at dispersing particles than the static mixer, the shear forces from venturi eductor 313 have the most significant effect on dispersing the particles.

Before the experiment, air flow rate was measured downstream of venturi eductor 313 and upstream of classifier apparatus 100. Flow rate was originally measured with an orifice meter and later with a Pitot tube. The flow rate determined by the Pitot tube was in good agreement with that given by the orifice meter.

An experiment was run for a period judged to be sufficient for the system to reach steady state. On average, this was 15 minutes. The run time began when screwfeeder 319 was turned on, which was after starting the air flow, accelerating disks 132 of BLMT particle separator 130 (see FIGS. 3 and 4) of classifier apparatus 100 up to the proper RPM level, and turning on disperser 321.

Before and after each experiment, the collection devices for the fine and coarse fractions separated by classifier apparatus 100 were weighed to determine the total masses of particles collected in the fine and coarse fractions ($m_f$ and $m_c$). The two fractions were split and riffled to obtain a representative sample for analysis of size distribution. Samples were analyzed on a Coulter™ LS 230 instrument, which measures particle size by light diffraction. From the intensity and angular distribution of light scattered, this analyzing instrument determines the fraction of particles in each of 116 size channels representing particle diameters from 0.04 to 2000 $\mu$m. The particle samples were dispersed in de-ionized water for analysis. At least two samples from each fraction were measured. The average size distribution was used to calculate efficiency.

Efficiency, defined in Equation 1-1 hereinabove, in size channel i is calculated as the mass of particles in size channel i in the coarse fraction divided by the sum of the masses of particles in size channel i in the coarse and fine fractions, $$efficiency_i = \frac{m_c q_{c,i}}{m_c q_{c,i} + m_f q_{f,i}} \quad (3\text{-}1)$$

where $q_{f,i}$ and $q_{c,i}$ are the fraction of particles in size channel i in the fine and coarse fractions.

The particle feed rate was calculated by dividing the sum of $m_c$ and $m_f$ by the run time assuming a constant feed rate throughout the experiment. This calculated value agreed well with the feed rate determined from the screwfeeder calibration.

Referring now to FIG. 16, in order to better represent industrial conditions, pressure-based particle delivery system 300 shown in FIG. 15 was eventually replaced in favor of a vacuum-based particle delivery system, generally designated 350. In industry, air classifiers are frequently operated under vacuum to reduce operating costs and avoid leakage problems. The downside of this set-up was that venturi eductor 313 (see FIG. 15), which was important for particle dispersion, could not be utilized. In vacuum-based particle delivery system 350, particles were pulled into the air stream under the influence of a vacuum developed by a suitable vacuum source 357 such as a pump situated on the downstream side of classifier apparatus 100. Air and particles pass through disperser 321 (e.g., a static mixer) before entering classifier apparatus 100. Particles leaving classifier apparatus 100 with the air were transported through a duct 359 and collected in a baghouse 363. Particles separated from the air were collected in coarse fraction collector 185 such as a sealed drum disposed below classifier apparatus 100 as in blower-based system 300 shown in FIG. 15.

A sample from the fine fraction was collected online by intercepting part of the air stream from classifier apparatus 100, diverting the fine fraction sample through a sampling tube 367 under the influence of an appropriate vacuum source 369, and bubbling the sample through de-ionized water contained in a container 371. To ensure that a representative sample is obtained, the velocity in sampling tube 367 is matched to the velocity in duct 359 from which the sample is taken. Velocities were measured with a Pitot tube.

Each experiment was run for 15 minutes. As with blower system 300 of FIG. 15, run time for vacuum-based system 350 began when screwfeeder 319 was turned on. Air flow was measured with a Pitot tube before the experiment. During the experiment, pressure drop across classifier apparatus 100 and baghouse 363 were monitored and remained essentially constant, indicating a constant air flow rate into classifier apparatus 100.

In the case of vacuum-based system 350, the fine fraction mass ($m_f$) and a sample for size analysis were obtained differently than in the case of blower-based system 300. Due to the presence of baghouse 363, the mass of particles collected at the top of classifier apparatus 100 could not be measured directly with accuracy. Instead, the value for $m_f$ was obtained by subtracting the coarse fraction mass ($m_c$) from the total feed mass ($m_F$). Precautions were taken to ensure that the mass of particles remaining in duct 359 upstream of classifier apparatus 100 or on the cyclone walls was negligible. This meant that particles not collected in coarse fraction collector 185 of classifier apparatus 100 could be considered part of the fine fraction. Total feed mass was obtained by multiplying feed rate by run time. Screwfeeder 319 was calibrated before and after each run to obtain an accurate feed rate.

Efficiency was again calculated based on fine and coarse fraction size distributions using Equation 3-2:

$$efficiency_i = \frac{m_c q_{c,i}}{m_c q_{c,i} + (m_F - m_C) q_{f,i}} \quad (3\text{-}2)$$

A representative sample from the fine fraction was obtained as described hereinabove. The coarse fraction mass and a representative sample for size analysis were obtained in the same way as with blower-based system 300.

Figure 17:
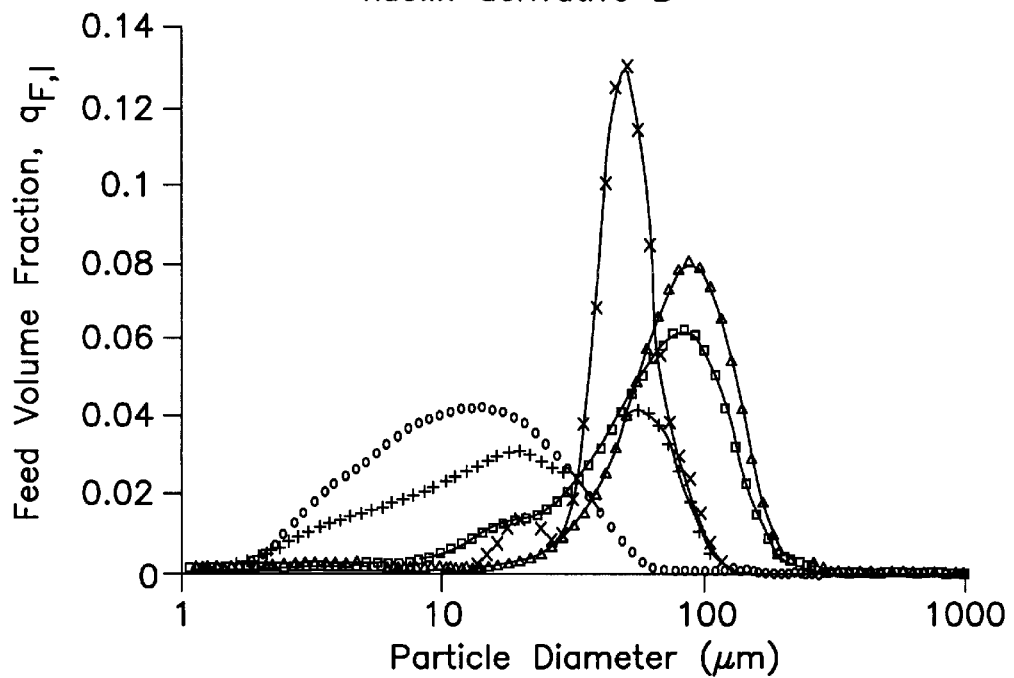
FIG. 17 is a plot of feed volume fraction as a function of particle diameter characterizing different types of particles used in testing the performance of the apparatus illustrated in FIG. 3.

Two materials were used to test the classifier apparatus 100: solid, soda-lime glass spheres from Potter's Industries and a porous, spray-dried kaolin derivative. Experiments were run with three different size distributions of glass spheres (3000 A, 5000 A, and an approximately equal volume mixture of 3000 A and 5000 A, where 3000 and 5000 are characteristic of the size distribution and A represents the glass composition) and two different size distributions of kaolin derivative (A and B). TABLE 3 set forth hereinbelow gives the density of these materials along with values for $D_{10}$, $D_{50}$, and $D_{90}$, i.e., the particle diameters for which 10, 50, and 90 volume % of the particles are smaller, respectively. The differential size distribution of the feed ($q_{F,i}$) for each material according to the Coulter™ LS 230 instrument is plotted in FIG. 17.

TABLE 3

| Material | Density ($kg/m^3$) | $D_{10}$ ($\mu m$) | $D_{50}$ ($\mu m$) | $D_{90}$ ($\mu m$) |
| --- | --- | --- | --- | --- |
| 3000A glass spheres | 2500 | 21 | 46 | 70 |
| 5000A glass spheres | 2500 | 3 | 11 | 30 |
| 3000/5000A glass sphere mixture | 2500 | 4 | 22 | 66 |
| Kaolin derivative A | 900 | 20 | 66 | 128 |
| kaolin derivative B | 800 | 38 | 78 | 133 |

The kaolin derivative is an industrial material, consisting of porous particles of varying shape that are composed of kaolin, an inorganic dispersant, and sodium silicate. These particles can break easily, generating many smaller particles, which have a different density than the original particle. Since the individual particles have varying density, the density given for the kaolin derivatives in TABLE 3 is only a bulk density whereas the density given for the glass spheres is a particle density.

The foregoing experimental set-up configurations, calculations, and data were utilized to determine that classifier apparatus 100, when equipped with split-flow inlet device 250 described hereinabove and illustrated in FIG. 11, provided optimal performance and yielded the widest range of cut sizes.

Figure 18:
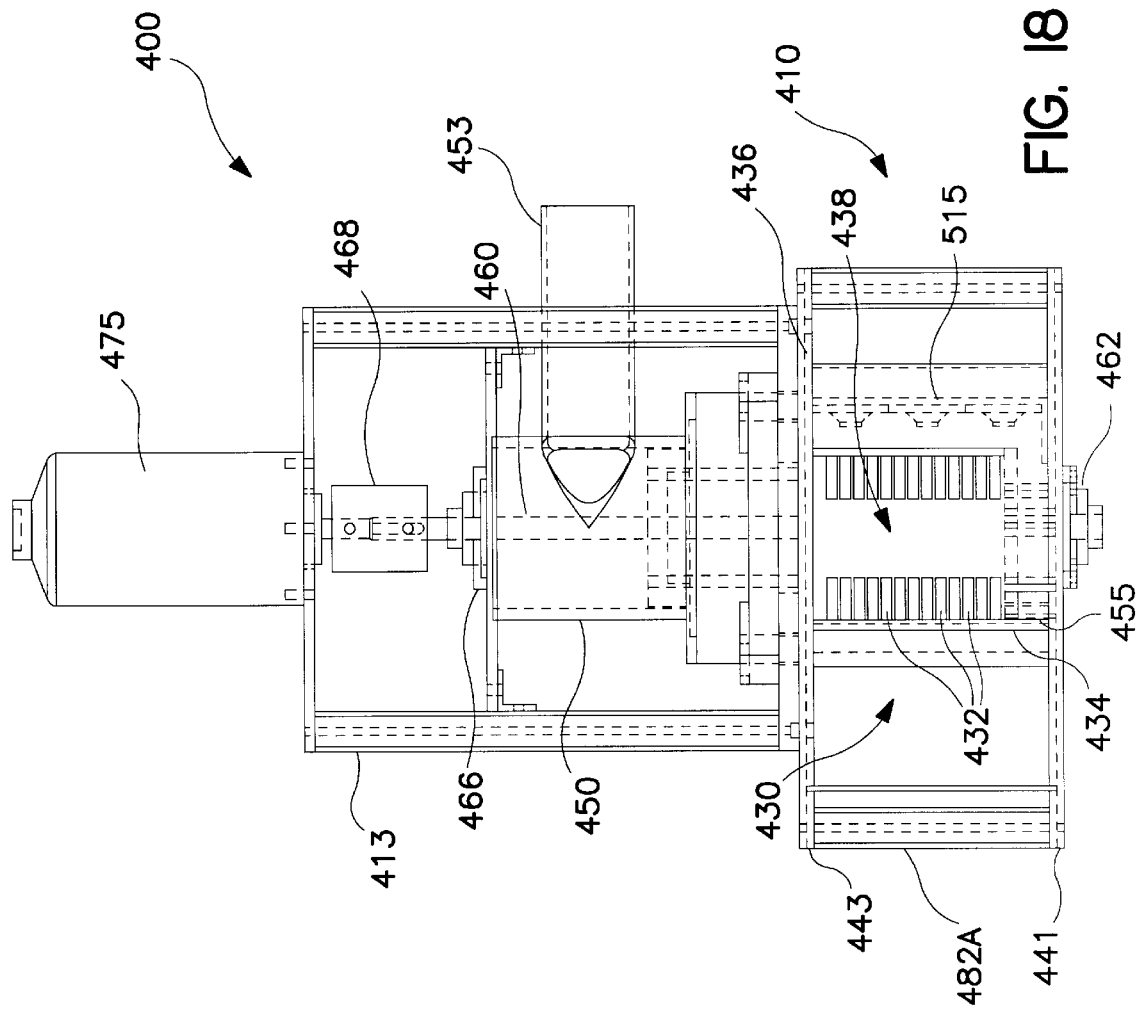
FIG. 18 is a cross-sectional, top plan view of a particle classifying apparatus provided in accordance with another embodiment of the present invention.
Figure 19:
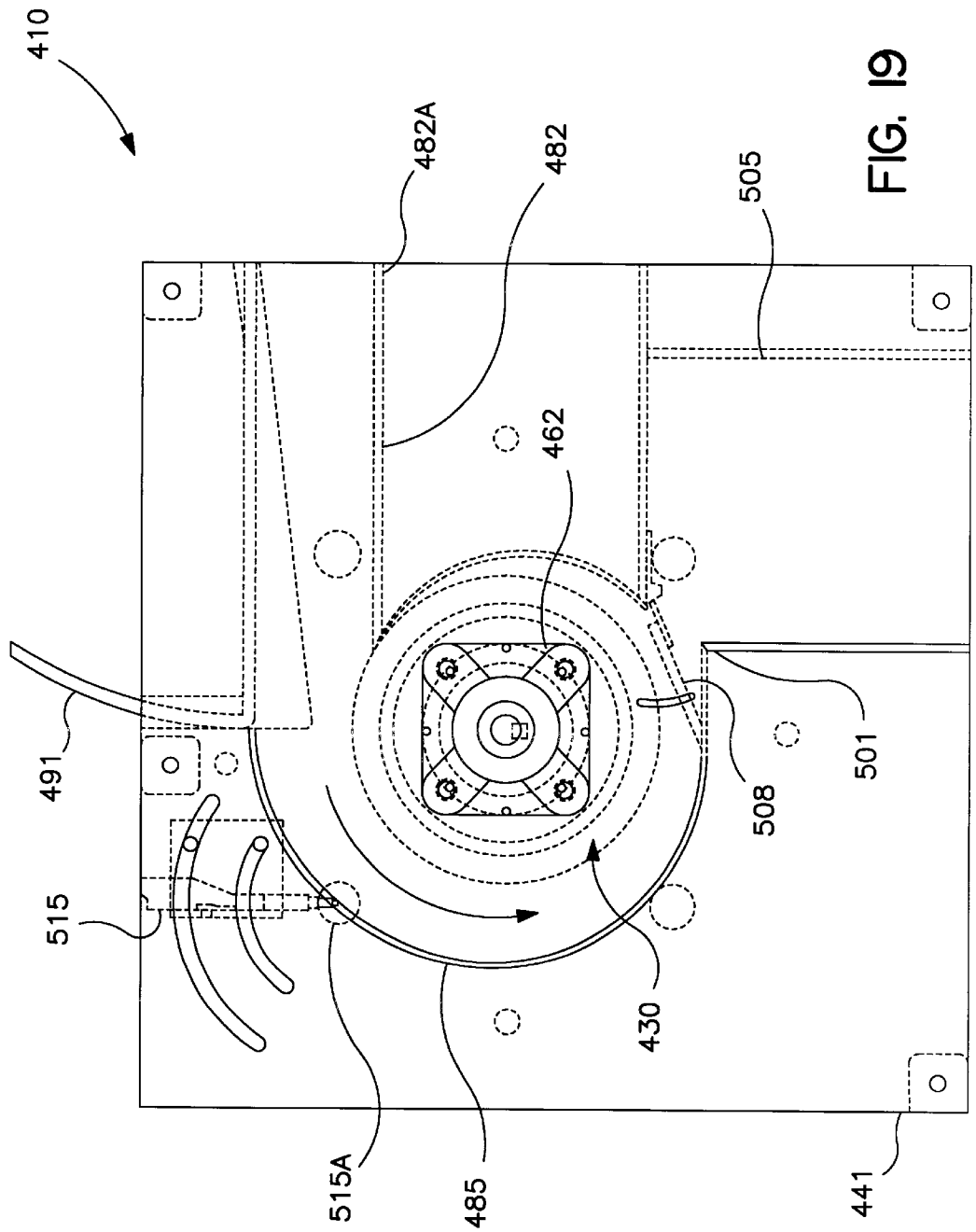
FIG. 19 is a cross-sectional, front elevation view of a scroll housing provided with the particle classifying apparatus illustrated in FIG. 18.
Figure 20:
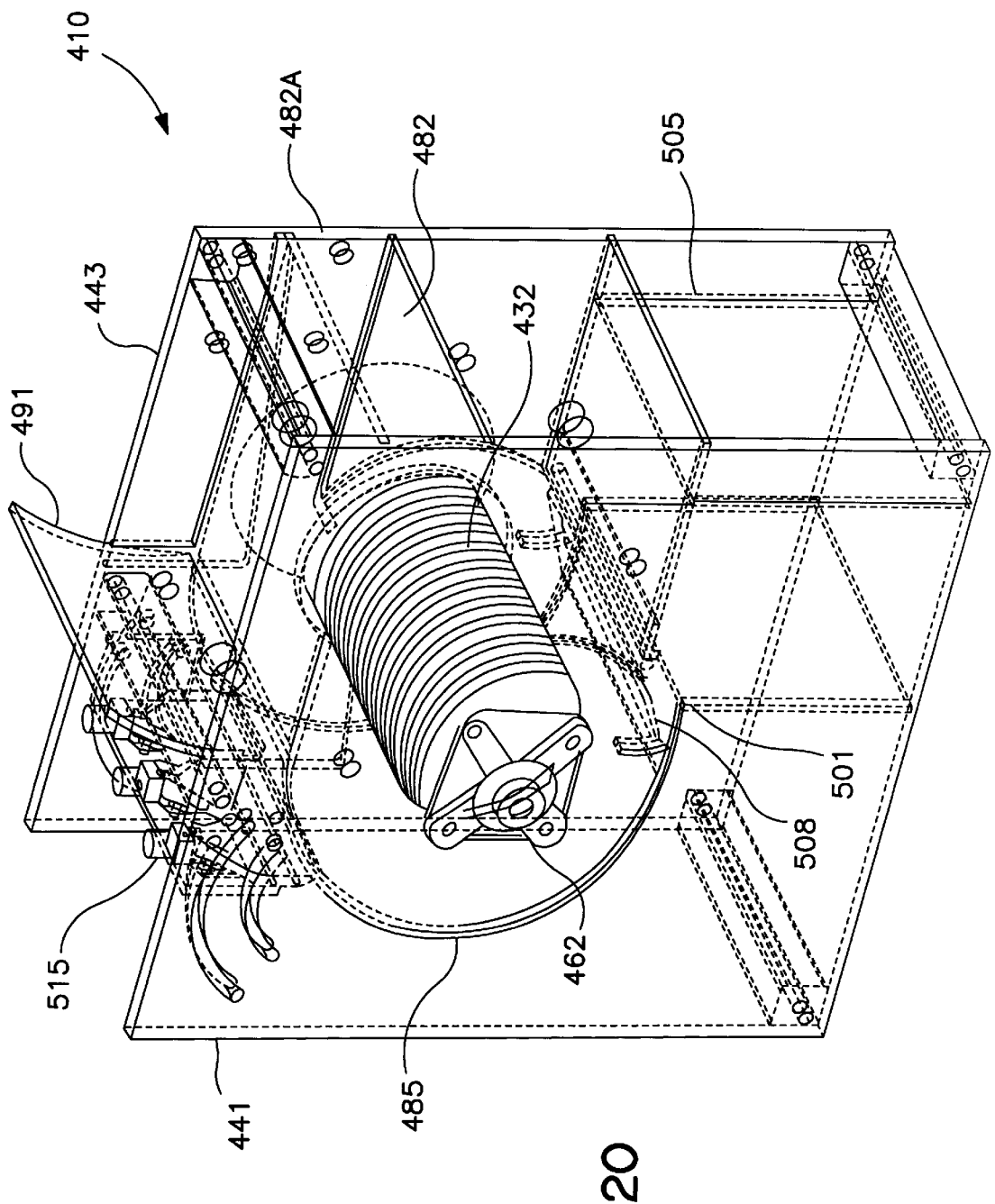
FIG. 20 is a cross-sectional perspective view of the scroll housing illustrated in FIG. 19.

Referring now to FIGS. 18–20, a particle classification apparatus, generally designated 400, is illustrated in accordance with a preferred embodiment of the invention. Referring specifically to the top plan view of FIG. 18, classifier apparatus 400 comprises a scroll housing, generally designated 410, attached to an auxiliary housing or framework 413. A BLMT particle separator, generally designated 430, is mounted within scroll housing 410. BLMT particle separator 430 comprises a stack of annular rotatable disks 432 disposed between a first plate 434 and a second plate 436, with the central openings of disks 432 collectively defining a hollow disk plenum 438. Preferably, disks 432 are spaced approximately 1 mm apart. BLMT particle separator 430 is otherwise structured similarly to BLMT particle separator 130 as detailed in FIGS. 4 and 5. However, disks 432 of BLMT particle separator 430 are oriented such that the axis of disk plenum 438 is horizontal or substantially horizontal whereas, in the previous embodiments, disk plenum 138 (see FIG. 3) is vertically or substantially vertically oriented.

First plate 434 of BLMT particle separator 430 is mounted to a first side wall 441 of scroll housing 410 and is solid. Second plate 436 of BLMT particle separator 430 is mounted at a second side wall 443 of scroll housing 410, and includes an opening to permit fine particles flowing into disk plenum 438 to exit scroll housing 410. The fine particles exit scroll housing 410 into an exit plenum 450 disposed in auxiliary housing 413. From exit plenum 450, the fine particles flow through an exit conduit 453 to exit classifier apparatus 400. A cylindrical structure 455 is interposed between first plate 434 of BLMT particle separator 430 and first side wall 441 of scroll housing 410, thereby ensuring that all fine particles pass through disks 432 in order to exit classifier apparatus 400. It will be noted, however, that this embodiment does not require the use of a vortex finder as in the previously described embodiments (see, e.g., vortex finder 150 in FIG. 3).

First plate 434 and second plate 436 are connected to a shaft 460 in a manner similar to the previously described embodiments. Shaft 460 is rotatably supported by a bearing 462 mounted to first side wall 441 of scroll housing 410, as well as by one or more bearings 466 mounted in auxiliary housing 413. A coupler 468 disposed in auxiliary housing 413 connects shaft 460 to the drive shaft of a motor 475 mounted to auxiliary housing 413. Motor 475 thus provides rotational power to shaft 460 to rotate BLMT particle separator 430, and preferably is operable at variable speeds.

As best shown in FIGS. 19 and 20, scroll housing 410 includes an inlet section 482 that has an inlet aperture 482A for admitting an appropriate fluid such as particle-laden air into scroll housing 410. The width of inlet section 482 and its aperture 482A is approximately equal to or greater than that of BLMT particle separator 430. The variable inlet section 482 allows fine angular velocity control of the air and entrained feed particles entering scroll housing 410, as well as providing the means to evenly distribute the feed particles across the entire surface of the BLMT particle separator 430. Inlet section 482 fluidly communicates with an involute section 485 characterized by a varying radius of curvature. Involute section 485 of scroll housing 410 is not concentrically disposed about BLMT particle separator 430, but rather the central axis of involute section 485 is offset from the axis of rotation of BLMT particle separator 430. Thus, the cross-sectional area of involute section 485 available for fluid flow around BLMT particle separator 430 decreases as fluid travels around the periphery of BLMT particle separator 430. Unlike the previously described embodiments, fluid flow through scroll housing 410 of the present embodiment is constrained to multiple eccentric paths or orbits around the circumference of BLMT particle separator 430. This configuration provides a greater opportunity for fine particles to be separated from coarse particles, and thus the efficiency of BLMT particle separator 430 is increased in comparison to the previously described embodiments.

Preferably, a variable entrance lip 491 is pivotable into inlet section 482 to permit adjustment of both the cross-sectional area of inlet section 482 and the direction of fluid flow into involute section 485. For a constant flow rate into scroll housing 410, it has been found that decreasing the inlet cross-sectional area increases inlet flow velocity, thereby producing a jet of dispersed particles into involute section 485. On the other hand, increasing the inlet cross-sectional area decreases inlet flow velocity, thereby producing a gentler dispersion of slowed particles into involute section 485. Moreover, the ability to alter the trajectory of the particles into involute section 485 by means of variable entrance lip 491 enables the tangential velocity of the inlet flow to be changed, thereby affecting particle classification in a desired manner.

A coarse fraction outlet aperture 501 establishes fluid communication between involute section 485 and a coarse fraction collecting chamber 505 disposed within the framework common to scroll housing 410. Like inlet aperture 482, the width of outlet aperture 501 is at least substantially as great as that of BLMT particle separator 430. The particles constituting the coarse fraction of the fluid entering scroll housing 410, having a greater mass/diameter and thus greater inertia than the fine particles, travel near the wall of involute section 485 and pass tangentially from involute section 485, through outlet aperture 501, and into collecting chamber 505. Preferably, a variable exit vane or skif 508 is pivotably mounted to a wall of scroll housing 410 to protrude into the primary flow stream moving through exit aperture 501 and vary the cross-sectional area of exit aperture 501. Decreasing the depth of skif 508 from the scroll housing wall (i.e., closing the outlet aperture to the coarse fraction collecting chamber 505) increases the nominal particle size extracted from scroll housing 410, such that only the largest particles leave involute section 485. Increasing the depth of skif 508 from the scroll housing wall decreases the nominal particle size extracted from involute section 485, such that a larger distribution of particles leave involute section 485.

Figure 21:
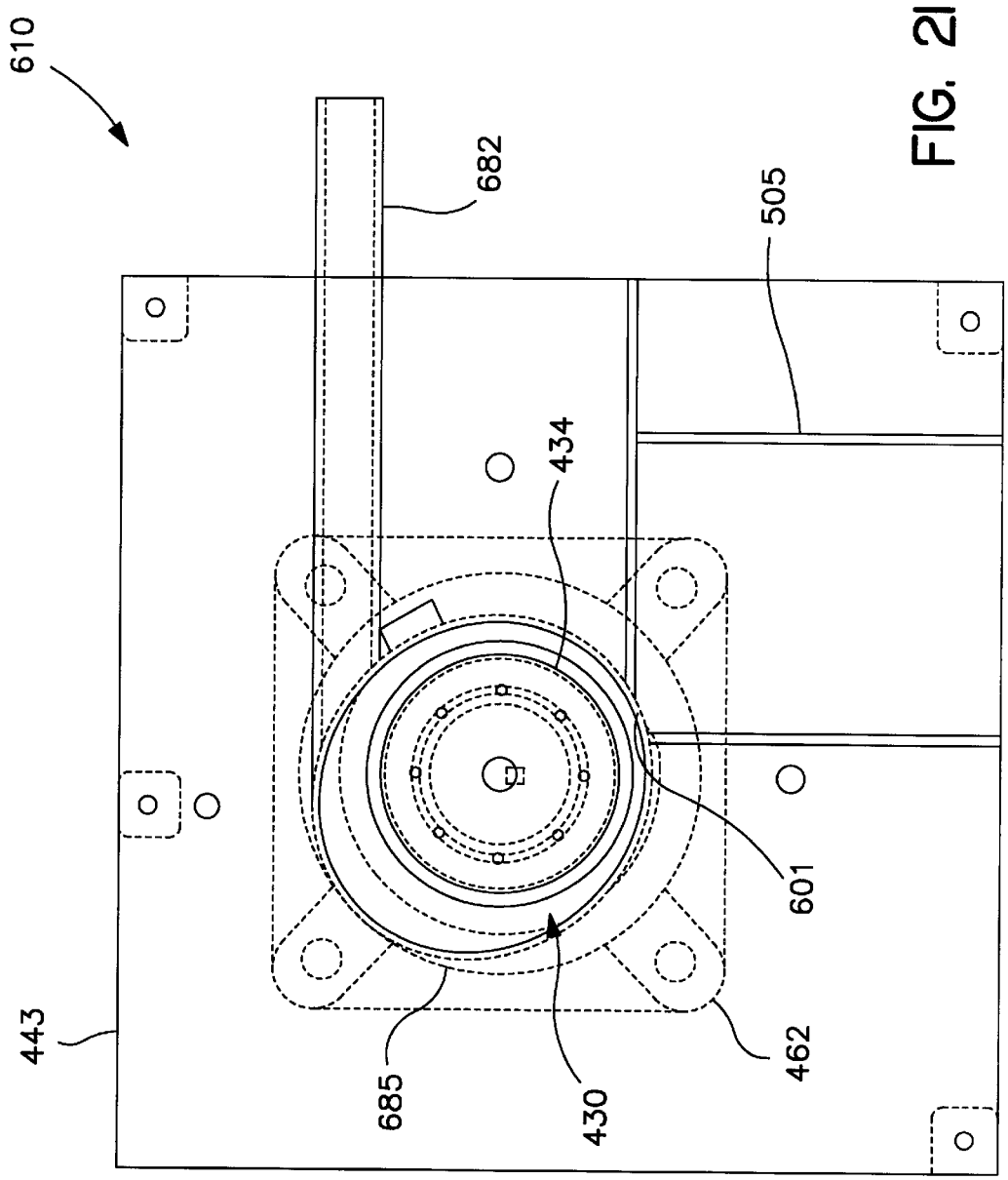
FIG. 21 is a cross-sectional, front elevation view of an alternative scroll housing provided with the particle classifying apparatus illustrated in FIG. 18.

In some applications, fine particles can be agglomerated with coarse particles in the fluid stream entering scroll housing 410, or otherwise be urged to flow with the heavier coarse particles along the inside wall of involute section 485 due to the high centrifugal forces developed within scroll housing 410. As a result, such fine particles may not have an opportunity to be classified by BLMT particle separator 430. As best shown in FIGS. 19 and 21, this undesirable effect can be remedied by providing one or more variable-angle air jets 515 pivotally mounted to a wall of scroll housing 410 with orifices 515A directed toward openings in involute section 485 downstream from inlet section 482. Air jets 515 can be advantageously employed as an airknife for breaking up agglomerated particles entering involute section 485 and redistributing fine particles away from coarse particles flowing along the wall of involute section 485. To optimize their function, air jets 515 can be pivoted to vary the direction of the jet streams introduced into scroll housing 410, and their airflow output can be adjusted by adjusting their fluid pressure.

The design of classifier apparatus 400 is believed to be superior than classifier apparatus 100 described hereinabove and illustrated in FIG. 3. Scroll housing 410 of classifier apparatus 400 causes the particle-laden fluid to flow eccentrically in multiple orbits around BLMT particle separator 430, with the result that a higher percentage of fine particles will be properly classified and separated from the coarse particles. Moreover, the fluid entering scroll housing 410 is not forced to reverse the direction of its flow, whereas the fluid entering classifier apparatus 100 must reverse direction and exit upwardly through vortex finder 150 (see FIG. 3). It has been found that such reversed flow can cause turbulent mixing of coarse and fine particles within classifier apparatus 100, which in turn can impair the ability of classifier apparatus 100 to maintain separation of coarse and fine particles. The principal control parameters for scroll housing 410 affecting cut size and efficiency have been found to be fluid flow, disk rpm, and particle loading (e.g., feed concentration expressed in terms of mass per unit time, such as kg/hr). The respective positioning of lip 491 and skif 508 have a more minor effect on cut size and efficiency.

Figure 22:
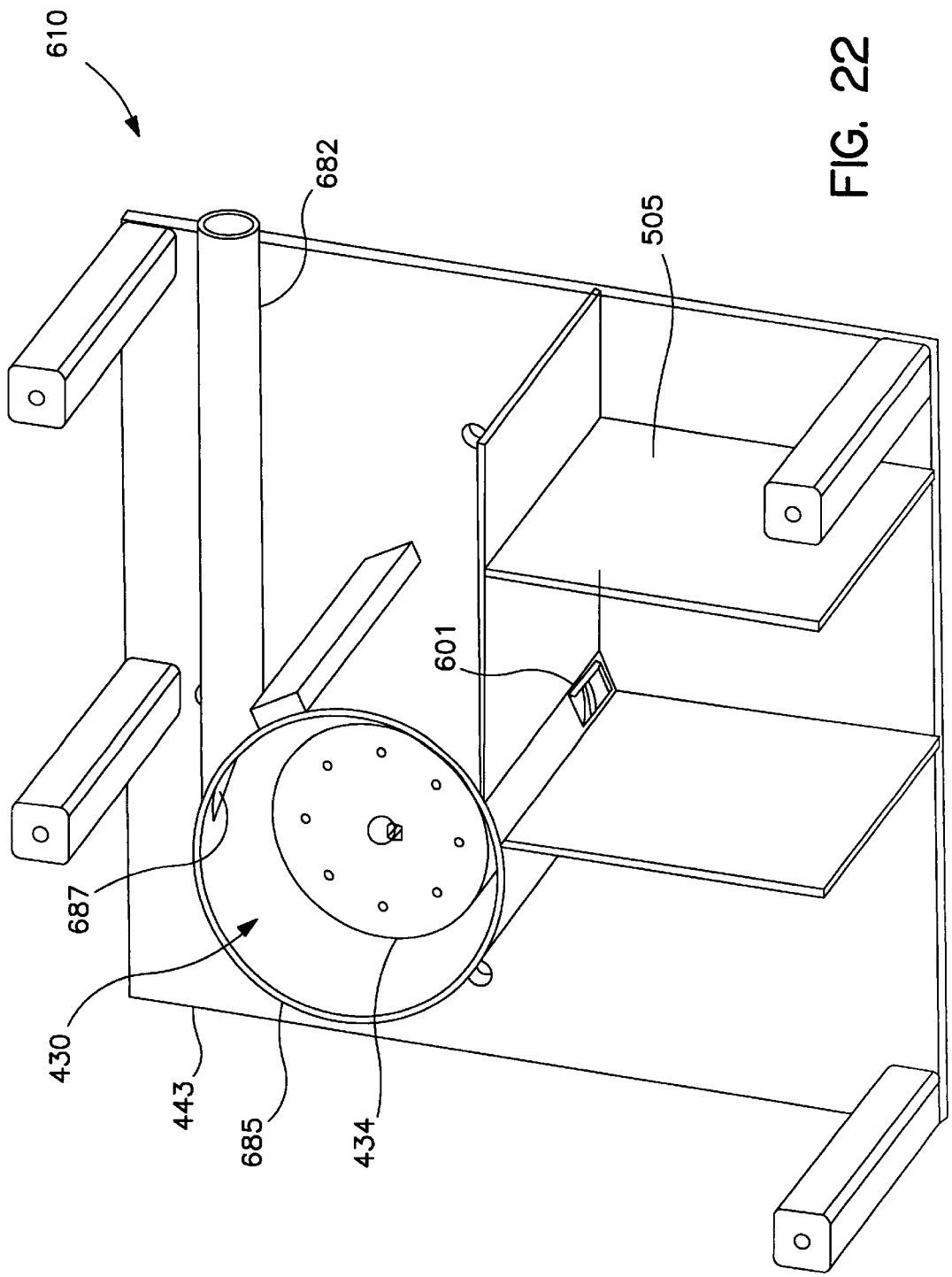
FIG. 22 is a cross-sectional perspective view of the scroll housing illustrated in FIG. 21.

Referring now to FIGS. 21 and 22, a scroll housing, generally designated 610, is provided for classifier apparatus 400 as an alternative to scroll housing 410 illustrated in FIGS. 18–20. Scroll housing 610 illustrated in FIGS. 21 and 22 differs from scroll housing 410 illustrated in FIGS. 18–20 in the manner in which particle-laden fluid enters scroll housing 610 and coarse particles exit therefrom. Scroll housing 610 comprises an inlet section 682 provided in the form of a tube. This inlet section 682 fluidly communicates with involute section 685 at an aperture 687 located proximate to one end of BLMT particle separator 430, which preferably is the end where the first, closed plate 441 is located. Exit aperture 601 into coarse fraction collecting chamber 505 is located proximate to the opposite end of BLMT particle separator 430, which preferably is the end where the second, open plate is located. As also seen in FIGS. 21 and 22, involute section 685 of scroll housing 610 could also be made more eccentric as compared with that of scroll housing 410. As in the case of scroll housing 410, fluid entering scroll housing 610 is constrained to flow in multiple passes around BLMT particle separator 430, and in the same direction as the rotation of BLMT particle separator 430. However, because of the axial spacing between aperture 687 and exit aperture 601, the fluid flow through scroll housing 610 has an axial component in the direction of exit plenum 450 (see FIG. 18) and thus is helical. The use of scroll housing 610 according to this design has been found to provide a more efficient classification when the particle distribution entering scroll housing 610 is relatively narrow. By contrast, the use of scroll housing 410 illustrated in FIGS. 18–20 has been found to provide a more efficient classification when the particle distribution is relatively broader. Other features characterizing scroll housing 610 can be similar to those of scroll housing 410, and accordingly are not described further.

EXPERIMENTAL DISCUSSION 2

Figure 23:
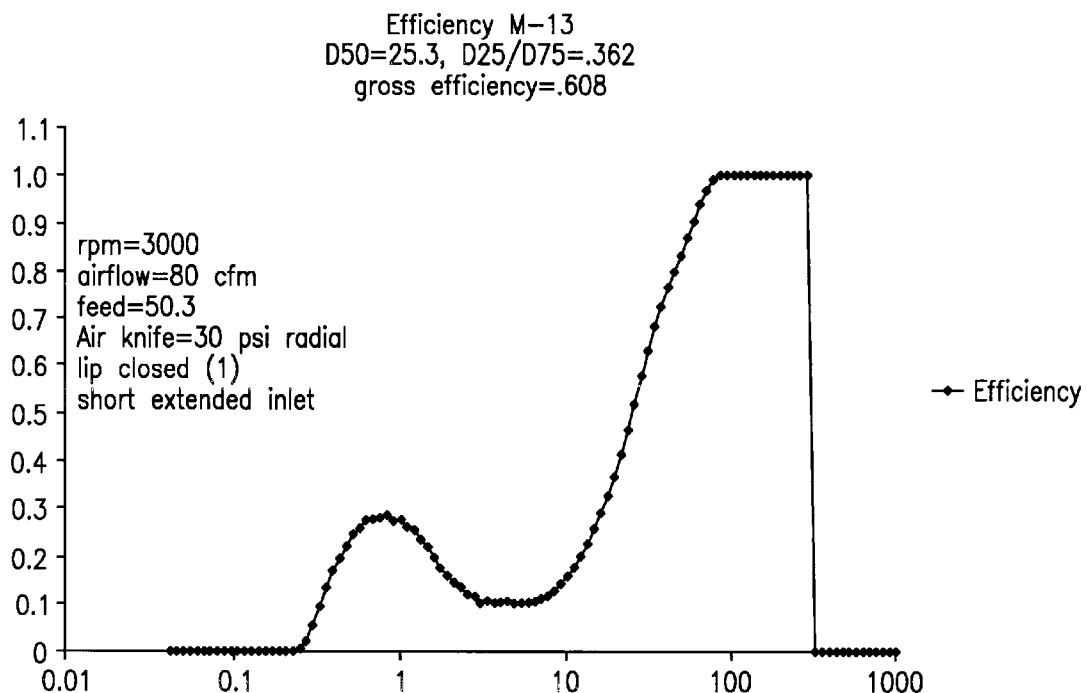
FIG. 23 is a plot of efficiency as a function of particle diameter obtained using the particle classifying apparatus illustrated in FIG. 18, wherein the particles were ISO 12103-1, A4 coarse test dust and the cut size was 25.3 $\mu$m.
Figure 24:
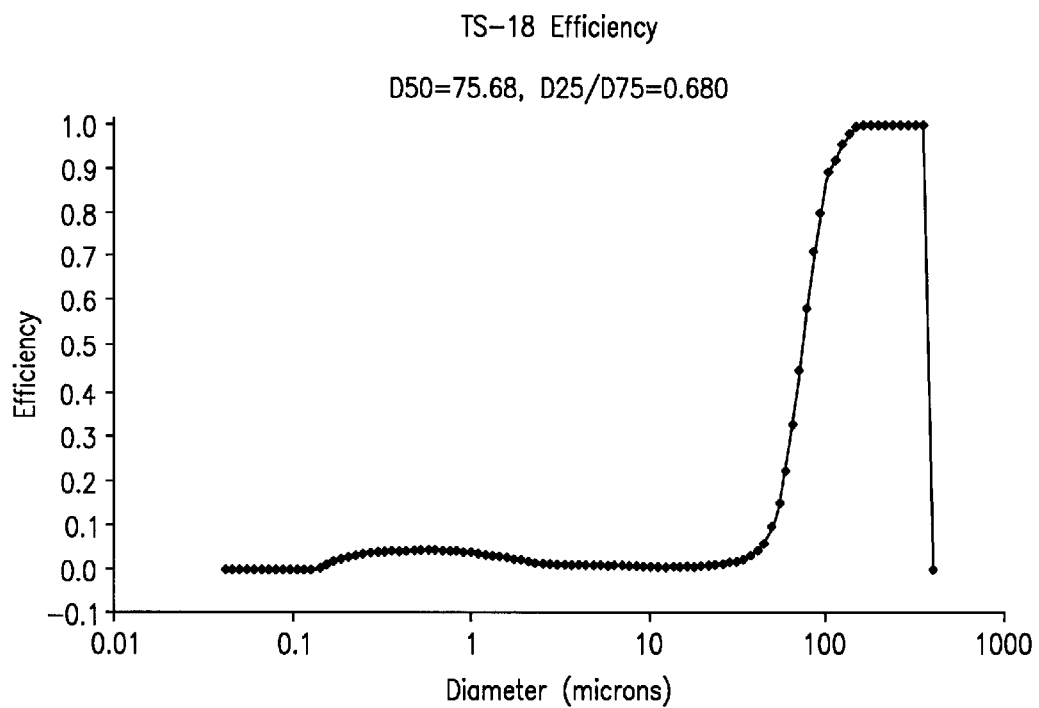
FIG. 24 is a plot of efficiency as a function of particle diameter obtained using the particle classifying apparatus illustrated in FIG. 18, wherein the particles were ISO 12103-1, A4 coarse test dust and the cut size was 75.7 $\mu$m.
Figure 25:
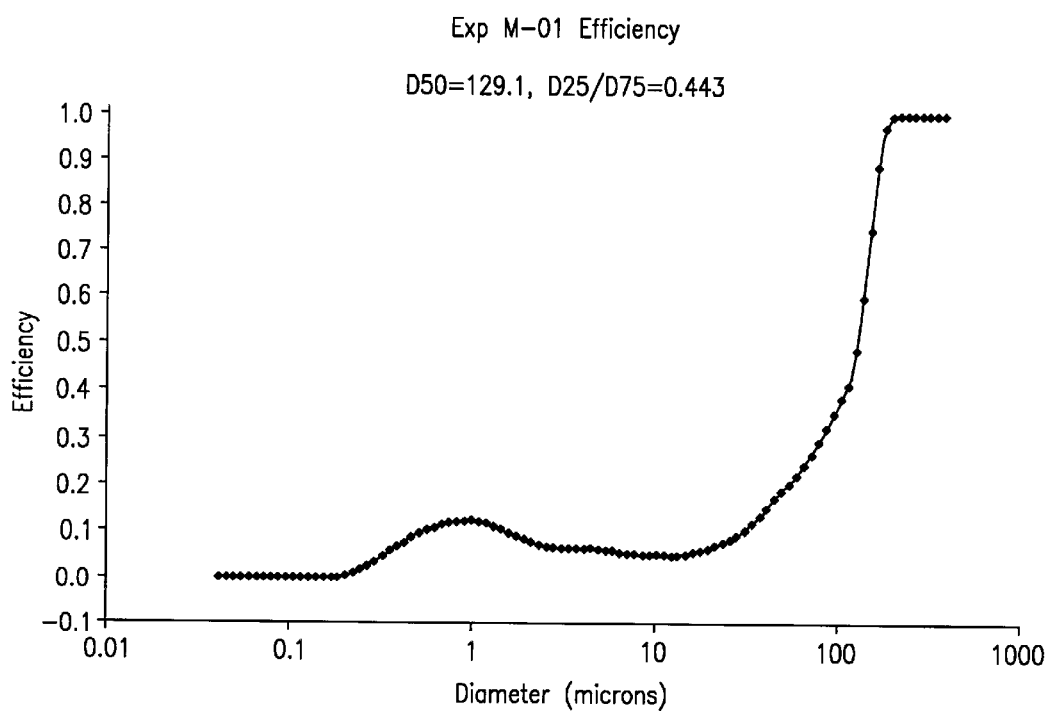
FIG. 25 is a plot of efficiency as a function of particle diameter obtained using the particle classifying apparatus illustrated in FIG. 18, wherein the particles were ISO 12103-1, A4 coarse test dust and the cut size was 129.1 $\mu$m.

Experiments were performed using classifier apparatus 400 equipped with scroll housing 410, and using an ISO 12103-1, A4 Coarse Test Dust (Arizona Road Dust) with a nominal size range from 1–150 μm ($d_{10}=3.19$, $d_{50}=29.34$ μm and $d_{90}=94.4$ μm). The performance envelope was tested at airflows of 80–100 cfm (cubic feet/minute), particle/air loadings between 0.0075 lbs/cu ft –0.0376 lbs/cu ft and at disk speeds between 2000–5000 rpm. Cut sizes were estimated by the $d_{50}$ of the classification (Fractional Efficiency) curve. Cut sizes between approximately 25 μm and 125 μm could be achieved by adjusting the control parameters. The sharpness of the classification curve was determined by the $d_{25}/d_{75}$ ratio, and varied between 0–1.0 (1.0=perfect sharpness) according to the cut size desired. In general, the sharpness was higher near the middle of the classification range. FIGS. 23–25 are the classification curves produced for nominal cut sizes of 25, 75 and 125 μm.

It will be understood that various details of the invention may be changed without departing from the scope of the invention. Furthermore, the foregoing description is for the purpose of illustration only, and not for the purpose of limitation—the invention being defined by the claims.

What is claimed is:

1. A radial inflow centrifugal apparatus for classifying a mixture of fine and coarse particles in a fluid stream by size or density, the apparatus comprising:
   (a) a housing comprising an inlet, an interior chamber, a coarse particle outlet, and a fine particle outlet;
   (b) a boundary layer momentum transfer device comprising a plurality of disks stacked in spaced, parallel relation in the interior chamber and rotatable about a disk axis, the disks having respective central openings cooperatively defining a plenum having a closed axial end and an opposing open axial end, wherein the plenum communicates with spaces defined between each adjacent disk to cooperatively define a fine particle flow path from the interior chamber, through the spaces, through the plenum and the open axial end thereof, and to the fine particle outlet;
   (c) an inlet flow control mechanism communicating with the interior chamber and providing an adjustable inlet flow path into the interior chamber; and
   (d) a drive mechanism coupled to the boundary layer momentum transfer device to cause rotation of the disks.

2. The apparatus according to claim 1 wherein the housing comprises a generally cylindrical wall.

3. The apparatus according to claim 1 wherein the housing comprises a wall, and at least a section of the wall is generally conical.

4. The apparatus according to claim 1 wherein the housing comprises a generally scroll-shaped section.

5. The apparatus according to claim 1 wherein the housing comprises a first inlet for conducting particles into the interior chamber and a second inlet for conducting fluid into the interior chamber.

6. The apparatus according to claim 1 comprising a coarse particle collector communicating with the housing interior.

7. The apparatus according to claim 6 comprising a vortex breaker interposed between the housing and the coarse particle collector.

8. The apparatus according to claim 6 comprising an adjustable coarse particle outlet interposed between the housing and the coarse particle collector.

9. The apparatus according to claim 1 wherein the boundary layer momentum transfer device comprises a spoked exit plate defining the open axial end.

10. The apparatus according to claim 1 wherein the boundary layer momentum transfer device comprises a plate defining the closed axial end.

11. The apparatus according to claim 1 wherein each disk has an annulus length and each disk space has an axial height, and the ratio of the annulus length to the axial height is approximately 25:1 to approximately 50:1.

12. The apparatus according to claim 1 wherein the drive mechanism comprises a rotatable shaft coupled to the boundary layer momentum transfer device.

13. The apparatus according to claim 12 wherein the boundary layer momentum transfer device comprises a spoked exit plate defining the open axial end and a solid plate defining the closed axial end, and the shaft is connected to the spoke exit plate and the solid plate.

14. The apparatus according to claim 12 wherein the drive mechanism comprises a motor coupled to the shaft.

15. The apparatus according to claim 1 comprising a hollow cylindrical tube interposed between the boundary layer momentum transfer device and the fine particle outlet.

16. The apparatus according to claim 15 wherein the hollow cylindrical tube comprises a first section and a second section axially adjustable in relation to the first section.

17. The apparatus according to claim 15 comprising an annular seal interconnecting the boundary layer momentum transfer device and the hollow cylindrical tube.

18. The apparatus according to claim 1 comprising an annular seal interconnecting the boundary layer momentum transfer device and the fine particle outlet.

19. The apparatus according to claim 1 wherein the inlet flow control mechanism comprises an inlet conduit connected to a wall of the housing, the inlet conduit is adjustable among a plurality of inlet flow positions including a tangential position and a normal position, and wherein at the tangential position the fluid inlet path has a substantially maximum tangential velocity component, and at the normal position the fluid inlet path has a substantially minimum velocity component.

20. The apparatus according to claim 1 wherein the inlet control mechanism comprises an inlet conduit having an inlet axis and slidably connected to a wall of the housing, the inlet conduit is adjustable among a plurality of inlet flow positions including a tangential position and a normal position, and wherein at the tangential position the inlet axis is oriented generally tangentially in relation to a central longitudinal axis of the housing interior, and at the normal position the inlet axis is oriented generally radially in relation to the central longitudinal axis.

21. The apparatus according to claim 1 wherein the inlet control mechanism comprises an inlet conduit connected to the inlet of the housing, and a flow diverting vane adjustably disposed proximate to the inlet opening, wherein the flow diverting vane defines first and second cross-sectional inlet flow areas, and adjustment of the flow diverting vane adjusts a ratio of the first inlet flow area to the second inlet flow area.

22. The apparatus according to claim 1 wherein the inlet control mechanism comprises an inlet conduit connected to the inlet of the housing, and an adjustable flow-diverting wall adjustably extendable into the inlet for changing a cross-sectional flow area through the inlet and thereby affecting incoming particle transport velocity and direction into the housing.

23. The apparatus according to claim 1 wherein the inlet control mechanism comprises a particle/fluid dispersion device communicating with the housing interior, the particle/fluid dispersion device adapted to inject an auxiliary fluid stream into a main fluid stream introduced through the inlet to affect incoming particle velocity and direction into the housing.

24. The apparatus according to claim 23 wherein the particle/fluid dispersion device comprises a fluid jet device movably mounted to the apparatus to permit adjustment of a direction of the auxiliary fluid stream into the main fluid stream.

25. The apparatus according to claim 23 wherein the particle/fluid dispersion device comprises a air knife device movably mounted to the apparatus to permit adjustment of a direction of the auxiliary fluid stream into the main fluid stream.

26. The apparatus according to claim 1 comprising a particle/fluid dispersion device communicating with the housing interior and disposed upstream from the inlet control mechanism.

27. The apparatus according to claim 1 comprising a particle/fluid dispersion device communicating with the housing interior and disposed downstream from the fine particle outlet.

28. A method for classifying a mixture of fine and coarse particles in a fluid stream, wherein fine particles have a size or density below a predetermined cut size and coarse particles have a size or density above the cut size, the method comprising the steps of:

(a) providing a particle separation assembly comprising:
  (i) a housing comprising an inlet, an interior chamber, a coarse particle outlet, and a fine particle outlet; and
  (ii) a boundary layer momentum transfer device comprising a plurality of disks stacked in spaced, parallel relation in the interior chamber and rotatable about a disk axis, the disks having respective central openings cooperatively defining a plenum having a closed axial end and an opposing open axial end, wherein the plenum communicates with spaces defined between each adjacent disk;

(b) creating a decreasing pressure gradient from the disk spaces to the plenum to establish a fine particle flow path through the inlet of the housing, the interior chamber, the disk spaces, the plenum, the open axial end of the plenum, and the fine particle outlet;

(c) flowing a particle-laden fluid stream through the inlet of the housing into the interior chamber;

(d) adjusting a tangential velocity component of the fluid stream to promote uniform dispersion of particles in the fluid stream as the fluid stream flows around and toward the disks; and (e) rotating the disks to eject coarse particles away from the disks, whereby fine particles are permitted to continue along the fine particle flow path to the fine particle outlet.

29. The method according to claim 28 wherein the tangential velocity component is adjusted by adjusting an inlet flow direction of the fluid stream with respect to a longitudinal axis of the housing.

30. The method according to claim 28 wherein the tangential velocity component is adjusted by extending an adjustable flow-diverting wall into the inlet to adjust an inlet flow direction of the fluid stream.

31. The method according to claim 28 wherein the tangential velocity component is adjusted by injecting an auxiliary stream into the fluid stream at a desired, adjustable angle to the fluid stream.

32. The method according to claim 31 comprising the step of adjusting the pressure of the auxiliary stream injected into the fluid stream to modify the effect of the auxiliary stream on the fluid stream.

33. The method according to claim 28 wherein the tangential velocity component is adjusted by splitting the fluid stream proximate to the inlet opening into first and second fractional streams, wherein the first fractional stream has a first flow rate in one direction and the second fractional stream has a second flow rate in an opposing direction, and by adjusting a flow ratio of the first flow rate to the second flow rate, whereby the fluid stream and the dispersion of particle approaching the rotating disks are altered.

34. The method according to claim 33 wherein the steps of splitting the fluid stream and adjusting the flow ratio are performed by providing an inlet flow control mechanism comprising an inlet conduit connected to the inlet of the housing and a flow diverting vane adjustably disposed proximate to the inlet of the housing, and adjusting the flow diverting vane.

35. The method according to claim 28 comprising the step of adjusting the cut size of the fine particle that are permitted to pass through the disks and the coarse particles that are prevented from passing through the disks.

36. The method according to claim 35 wherein the cut size is adjusted by controlling an inlet flow direction of the fluid stream with respect to a longitudinal axis of the housing.

37. The method according to claim 35 wherein the cut size is adjusted by splitting the fluid stream proximate to the inlet of the housing into first and second fractional streams, wherein the first fractional stream has a first flow rate and the second fractional stream has a second flow rate, and by adjusting a flow ratio of the first flow rate to the second flow rate.

38. The method according to claim 35 wherein the cut size is adjusted by varying the angular velocity at which the disks rotate.

39. The method according to claim 35 wherein the cut size is adjusted by varying a volumetric flow rate of the fluid stream entering the particle separation assembly.

40. The method according to claim 35 wherein the cut size is adjusted by varying a cross-sectional area of the coarse particle outlet.

41. The method according to claim 28 wherein the interior chamber of the housing is scroll-shaped to produce eccentric fluid flow paths around the boundary layer momentum transfer device in the same direction as the rotation of the disks.

* * * * *